United States Patent
Leblang et al.

(10) Patent No.: US 10,374,816 B1
(45) Date of Patent: Aug. 6, 2019

(54) NETWORK CONFERENCE MANAGEMENT AND ARBITRATION VIA VOICE-CAPTURING DEVICES

(71) Applicant: Amazon Technologies, Inc., Seattle, WA (US)

(72) Inventors: Jonathan Alan Leblang, Menlo Park, CA (US); Milo Oostergo, Issaquah, WA (US); James L. Ford, Bellevue, WA (US); Kevin Crews, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 15/840,940

(22) Filed: Dec. 13, 2017

(51) Int. Cl.
*G10L 15/18* (2013.01)
*G10L 15/22* (2006.01)
*H04L 12/18* (2006.01)
*H04M 3/56* (2006.01)
*H04W 40/24* (2009.01)
*H04L 29/08* (2006.01)
*G10L 13/00* (2006.01)

(52) U.S. Cl.
CPC .......... *H04L 12/1822* (2013.01); *G10L 15/22* (2013.01); *H04L 12/1818* (2013.01); *H04L 67/306* (2013.01); *H04M 3/563* (2013.01); *H04W 40/244* (2013.01); *G10L 13/00* (2013.01); *G10L 15/1815* (2013.01); *G10L 2015/223* (2013.01); *H04M 2242/30* (2013.01)

(58) Field of Classification Search
None
See application file for complete search history.

(56) References Cited

U.S. PATENT DOCUMENTS

| | | | |
|---|---|---|---|
| 9,641,954 B1 * | 5/2017 | Typrin | H04W 4/00 |
| 2017/0076720 A1 * | 3/2017 | Gopalan | G06F 3/167 |
| 2017/0083285 A1 * | 3/2017 | Meyers | G10L 15/063 |
| 2018/0277107 A1 * | 9/2018 | Kim | G10L 15/28 |
| 2019/0005960 A1 * | 1/2019 | Naravanekar | G10L 15/30 |

* cited by examiner

Primary Examiner — Joseph A Bednash
(74) Attorney, Agent, or Firm — Knobbe, Martens, Olson & Bear, LLP

(57) ABSTRACT

Systems and methods are provided for managing a conference call with multiple voice-enabled and voice-capturing devices, such as smart speakers. Reproduced, duplicate voice commands can cause unexpected results in a conference call. The voice commands can be determined to be received from the same conference call. A voice command for a particular voice-enabled device can be selected based on an energy level of an audio signal, event data, time data, and/or user identification.

20 Claims, 12 Drawing Sheets

```
{
    "event_id":" 1f1a73ce-ebfc-4bb1-94cd-723e4de04b97",
    "Subject":"Regional Status Meeting",
    "Start":{
       "DateTime":"2017-11-02T17:00:00",
       "TimeZone":"Pacific Standard Time"
    },
    "End":{
       "DateTime":"2017-11-02T17:30:00",
       "TimeZone":"Pacific Standard Time"
    },
    "Organizer":{
       "User":{
          "Id":"john.doe",
          "Name":"John Doe",
          "Address":"john.doe@acme.com"
       }
    },
    "Participants":[
       {
          "User":{
             "Id":" jane.evans ",
             "Name":"Jane Evans",
             "Address":"jane.evans@acme.com"
          }
       },
       {
          "User":{
             "Id":"bob.smith",
             "Name":"Bob Smith",
             "Address":"bob.smith@acme.com"
          }
       }
    ],
    "Locations":[
       {
          "Location":{
             "Name":"NYC Room 312",
             "Id":"NYC-RM-312"
          }
       },
       {
          " Location":{
             "Name":"LA 2nd Floor Conference",
             "Id":"LA-2-FLR"
          }
       },
       {
          "Location":{
             "Name":"SF Room Avalon",
             "Id":"SF-RM-Avalon"
          }
       }
    ]
}
```

NETWORK CONFERENCE MANAGEMENT AND ARBITRATION VIA VOICE-CAPTURING DEVICES

BACKGROUND

A conference meeting can be established using two or more devices. For example, multiple telephones or conferencing systems can connect to a conference bridge. A conferencing system can include microphones, speakers, and video cameras. The conference can connect meeting participants in multiple locations.

Some voice-enabled devices, such as a smart speaker, can include wireless and voice command functionality that is integrated with a virtual assistant, and the voice-enabled devices can be used at the various conference locations. Verbal commands uttered by a meeting participant for a voice-enabled device at the participant's location may be communicated over the conference bridge to other conference locations. Thus, a problem can arise where voice-enabled devices at multiple locations receive the same voice input for a command that was not intended for devices remotely located from the participant. Arbitration may be required to determine which of the multiple voice-enabled devices the voice command was intended for.

BRIEF DESCRIPTION OF THE DRAWINGS

Embodiments of various features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 6 depicts example event data.

DETAILED DESCRIPTION

Figure 1A:
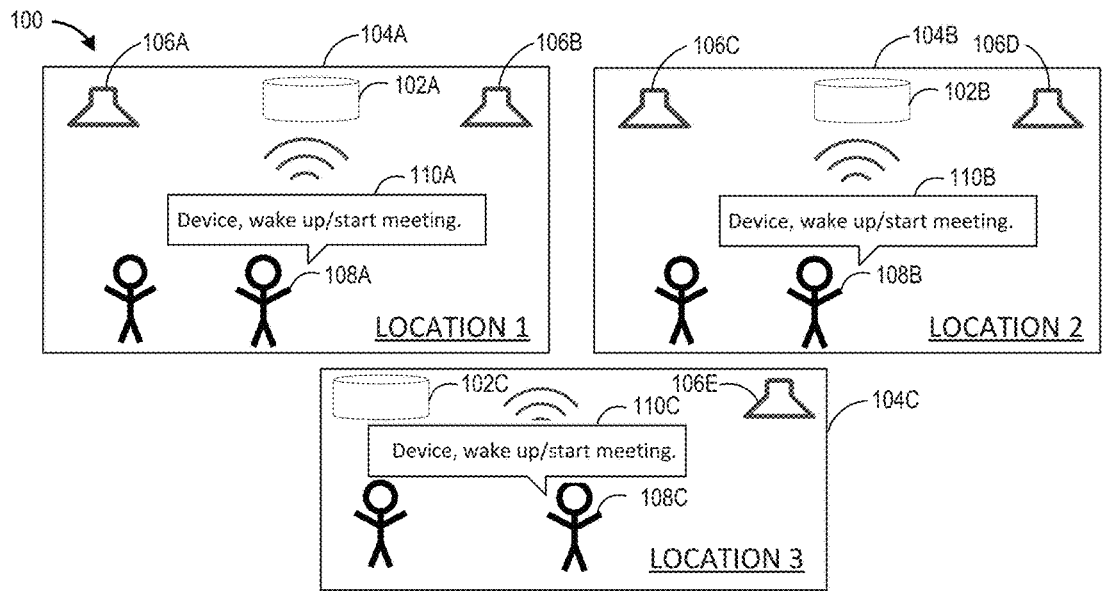
FIGS. 1A-1D are pictorial diagrams depicting an example conference call with voice-enabled devices.

Generally described, aspects of the present disclosure are directed to a system and method for voice based arbitration. More specifically, in the context of a conference meeting with remote participants and voice-enabled devices (e.g., a "smart speaker" or a "voice-based assistant"), an issue can arise where remote voice-enabled devices inadvertently pick up audio from another conference location that corresponds to voice commands directed towards a particular device or with respect to a particular location. Thus, a voice based system can perform arbitration and determine that a voice command is directed towards a particular voice-enabled device out of several devices. Aspects of the present disclosure relate to solutions for voice-enabled device arbitration based on ad-hoc group determination, event data, time data, and/or user identification.

Some voice based systems lack arbitration functionality. For example, in a conference with multiple voice-enabled devices, two or more of the devices may inadvertently pick up voice commands that were not directed towards them. Accordingly, the processing of inadvertent voice commands can cause voice system errors such as, but not limited to, unexpected cancellation of conference calls or an incorrect execution of a command. Some voice based systems may have arbitration functionality; however, such arbitration solutions may be designed for arbitration within a local setting, e.g., within a home, and/or may not function effectively in another setting such as a conference call or a meeting with remote participants.

Accordingly, the systems and methods described herein may improve computer-related technology. In some embodiments, an arbitration service or arbitration functionality may improve over some voice based systems in some settings, such as a conference call setting. The technical solutions for arbitration described herein may effectively process voice based commands that are received from multiple voice-enabled devices from various remote locations. Such solutions may use features related to ad-hoc group determination, event data determination, time data determination, and/or user identification to accomplish arbitration. Thus, the systems and methods described herein may enable more accurate voice command processing. For example, voice commands received from a conference location may be correctly processed by a voice based system; and/or voice-enabled devices may be accurately controlled by voice commands.

The systems and methods described herein may be intrinsically tied to computer and/or network technology because such solutions may be related to voice-enabled devices, speech processing, and/or communication over computer networks. For example, the arbitration techniques and solutions described herein may be intrinsically tied to speech processing technology of spoken utterances. Speech processing technology can include the processing of speech audio signals into a digital representation. Aspects of such computer technology can involve the acquisition, interpretation, storage, transfer, and output of speech signals. The systems and methods described herein may also control the output, such as audio output, of voice-enabled computer devices.

FIGS. 1A-1D are pictorial diagrams depicting an example conference call with voice-enabled devices. In FIG. 1A, the example conference environment 100 includes the locations 104A, 104B, 104C. The first location 104A includes a first user 108A, a first voice-enabled device 102A, and additional devices 106A, 106B. The second location 104B includes a second user 108B, a second voice-enabled device 102B, and additional devices 106C, 106D. The third location 104C includes a third user 108C, a third voice-enabled device 102C, and additional device(s) 106E. The additional devices 106A, 106B, 106C, 106D, 106E can include, but are not limited to, conference room devices such microphones, speakers, cameras, displays, and/or video equipment. The voice-enabled device(s) 102A, 102B, 102C and the additional devices 106A, 106B, 106C, 106D, 106E can be components of and/or communicate with a voice based system. As shown, each user 108A, 108B, 108C can make an utterance 110A, 110B, 110C, which can be a wake up and/or a start meeting command. In response to receiving and/or processing each respective speech utterance 110A, 110B, 110C, the voice based system can connect each of the locations 104A, 104B, 104C to a conference call.

Figure 1B:
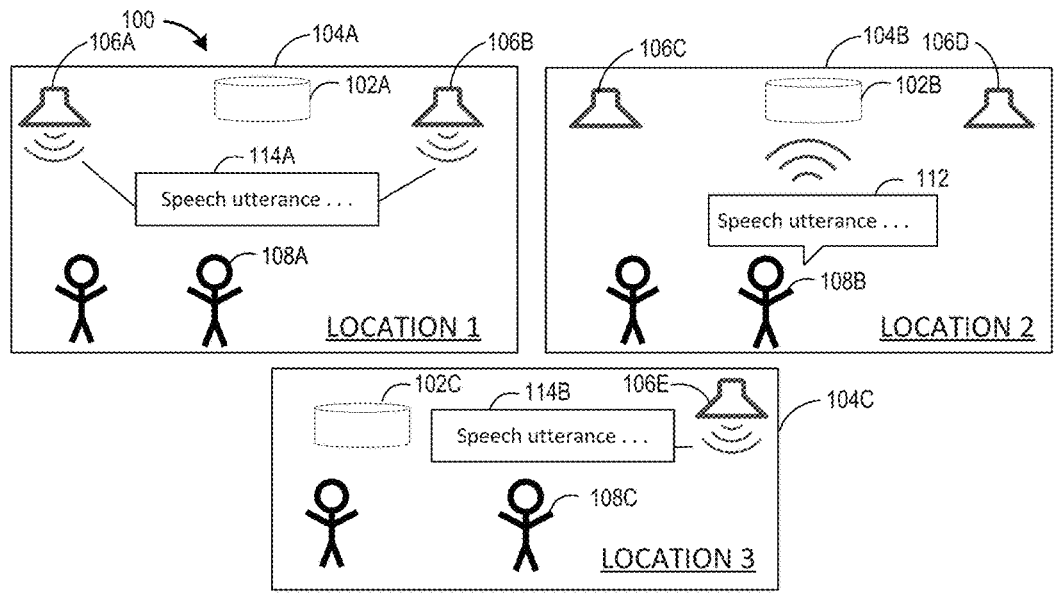

As shown in FIG. 1B, the second user's speech utterance 112 can be received as audio input by the second location's 104B device(s) 102B, 106C, 106D. The audio input can be processed by the voice based system. In each of the first and third locations 104A, 104C, audio output 114A, 114B can be generated by the device(s) 102A, 102C, 106A, 106B, 106E. The audio output can correspond to the speech utterance 112 that originated from the second location 104B. The participants are able to conduct their conference call via the voice based system.

Figure 1C:
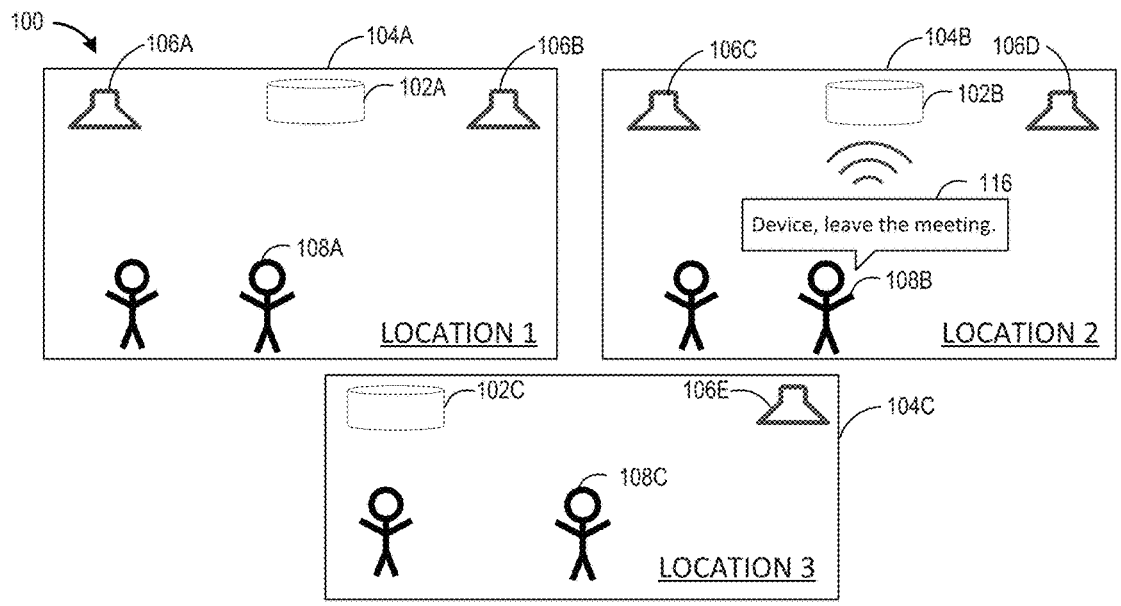

In FIG. 1C, the participant(s) at the second location 104B are ready to leave the conference call. In some situations, the participant(s) at the second location 104B would like to leave the conference, but the participant(s) at the first location 104A and the third location 104C would like to remain on the conference call. The user 108B can make a speech utterance 116 to leave the conference call. The utterance 116 can be received as audio input by the second location's 104B device(s) 102B, 106C, 106D. The audio input can be processed by the voice based system and at least the voice-enabled device 102B can be removed from the conference, which removes the participant(s) at the second location 104B from the conference.

Figure 1D:
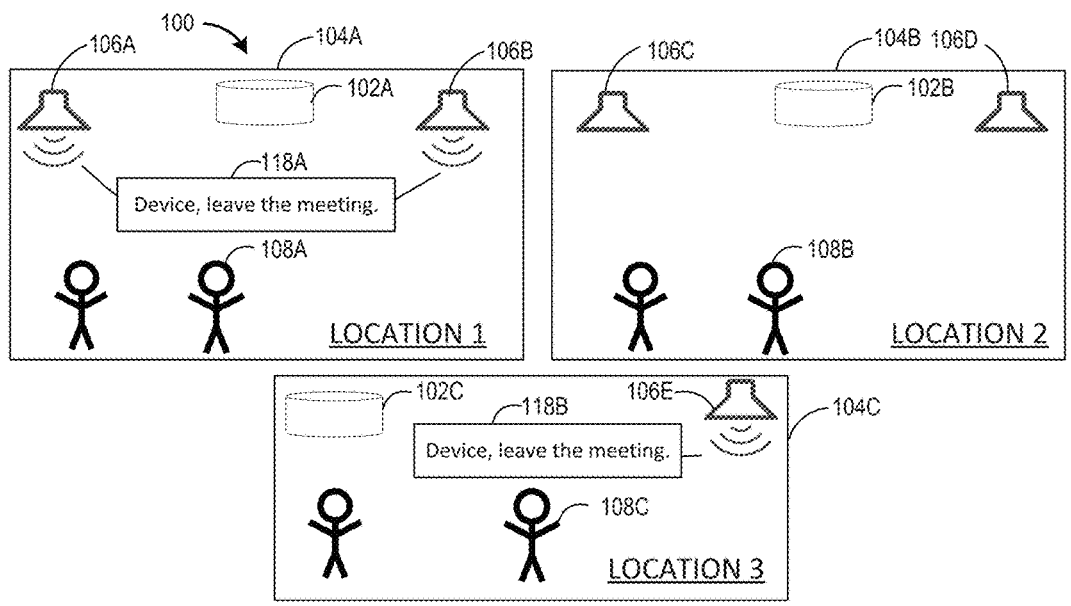

In some voice based systems that lack conference arbitration capabilities, audio output that is reproduced from a first location to a second location and that corresponds to a voice command can have inadvertent results. In FIG. 1D, the audio output 118A, 118B can be generated by the devices 106A, 106B, 106E. The audio output 118A, 118B can correspond to the utterance 116 for the voice command to leave the conference call from the second location 104B of FIG. 1C. Accordingly, the voice-enabled devices 102A, 102C of the first and third locations 104A, 104C can receive the audio output 118A, 118C. The audio output 118A, 118C can be processed by the voice based system and can inadvertently further cause at least the voice-enabled devices 102A, 102C to be removed from the conference call. Thus, the participant(s) at the first and third locations 104A, 104C can mistakenly or incorrectly be removed from the conference.

However, in a voice based system with conference arbitration capabilities, the audio output 118A, 118C can be ignored by the voice based system. The audio output 118A, 118C and the speech utterance 116 can be processed by the voice based system and the system can determine the intended voice-enabled device for the corresponding command. Thus, the voice based system can handle situations where multiple voice-enabled devices receive the same command in a conference call setting without unintended results.

The arbitration techniques described herein may be applied to a voice based system outside of personal or family use cases. The voice based system may be configurable with multiple voice-enabled devices used by a large organization, such as a corporation, which can include tens, hundreds, or thousands of devices. In a home setting, a user can configure a voice-enabled device with the voice based system using an application on a smartphone or tablet. In contrast to the home setting, the voice based system in a large-scale setting can include tools to set up large numbers of devices at once, which can create accounts for the devices and/or link the accounts to a master account. A console enables an administrator to assign devices to rooms or locations. The voice based system can be integrated with the organization's network to have access to event data, such as meeting or calendar information, as well as the location or room information of the voice-enabled devices.

In either small or large-scale settings, duplicate command issues can arise where there is a voice-enabled device coupled with a voice based system, and where the voice-enabled device acts as a remote control of additional devices, such as a video teleconference system. Where a voice-enabled device serves as its own speaker phone and/or microphone, some of the duplicate command issues may not arise since the voice-enabled device can cancel out its own audio. In contrast, where there are separate speaker and microphone devices, such as in the remote control scenario, audio commands from other remote locations may be picked up by conference devices and may cause the duplicate command issues described herein.

Figure 2A:
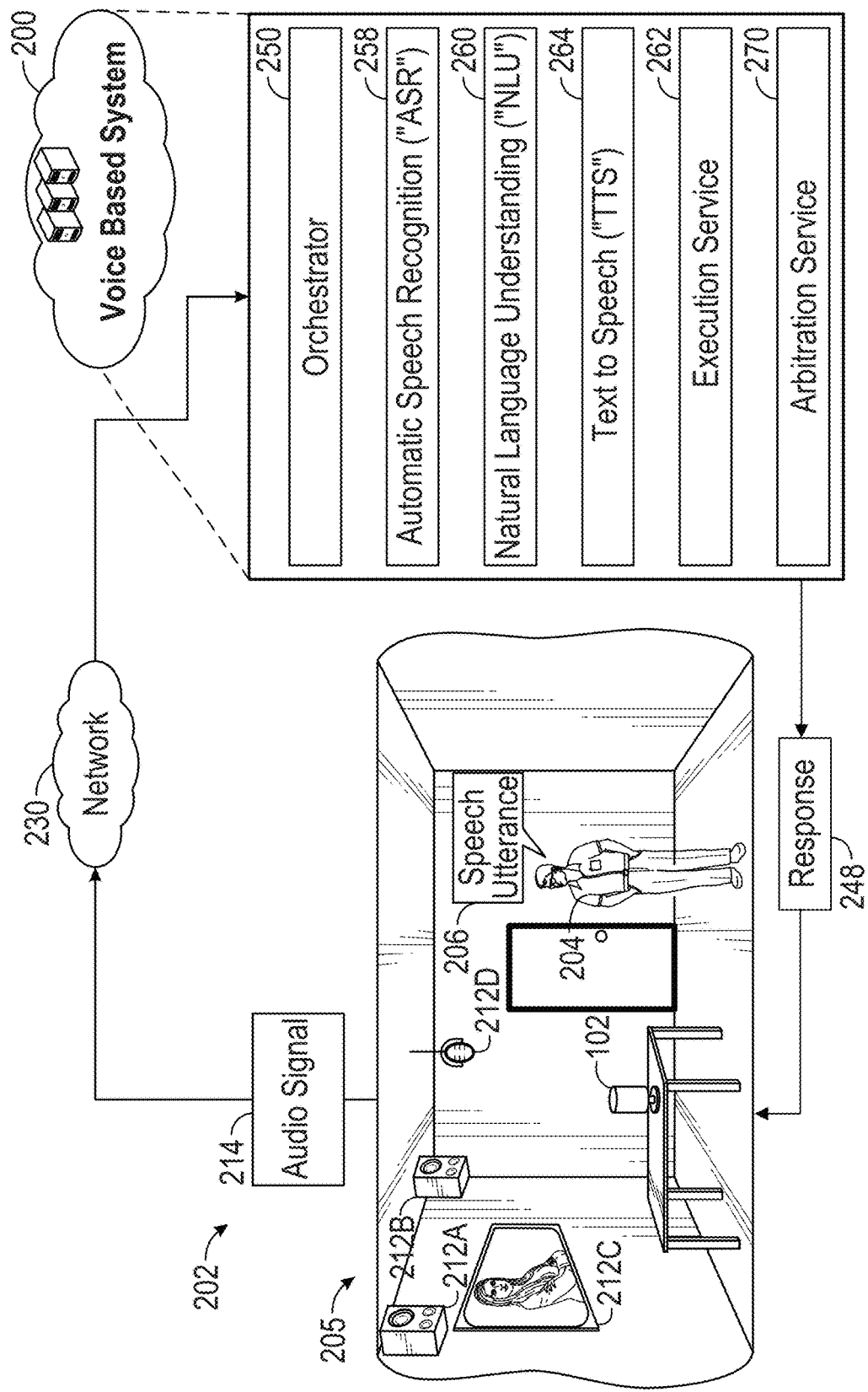
FIG. 2A is a pictorial and schematic block diagram depicting an illustrative network environment for implementing a voice based system.

FIG. 2A is a schematic diagram of an illustrative environment 202 in which a user 204 issues a speech utterance 206 at a location 205. As described herein, the user 204 can communicate with other users in a conference call using a voice based system 200, which can include and/or communicate with multiple voice-enabled devices and/or additional devices. A voice-enabled device 102 can detect the speech utterance 206. The voice based system 200 and/or the voice-enabled device 102 may be associated with additional device(s) 212A, 212B, 212C, 212D, such microphones, speakers, cameras, displays, and/or video equipment (collectively "the additional device" 212). The voice based system 200 can have various components capable of determining which of the voice-enabled devices the one or more audio signals was directed towards. The voice based system 200 may be wirelessly connected (e.g., Wi-Fi, Bluetooth, ZigBee, etc.) with the voice-enabled device 102 and/or the additional device 212. The voice based system 200 may control operations of the voice-enabled device 102 and/or the additional device 212 using speech utterances that are processed by the voice based system 200. In some embodiments, the voice-enabled device 102 may include an integrated display.

The voice based system 200 may process audio signals received from the voice-enabled device 102 and may generate a response. For example, the voice based system 200 may determine which of the voice-enabled devices, including the voice-enabled device 102 from the location 205, the one or more audio signals was directed towards. The voice based system 200 can perform an action responsive to a command from an audio signal.

In some embodiments, the voice-enabled device 102 may have one or more microphones that are used to capture user speech, such as the speech utterance 206, and one or more speakers that are used to output audio content. In some embodiments, the voice-enabled device 102 may be designed to operate from a fixed location, and in other embodiments, the voice-enabled device 102 may be portable or mobile. For instance, the voice-enabled device 102 may be a device, such as, but not limited to a smart speaker, smartphone, tablet, media player, computer, or wearable device.

As shown in the environment 202, the user 204 can interact with the voice-enabled device 102. The user 204 may interact with the voice-enabled device 102 through a speech utterance 206. For example, the voice-enabled device 102 may receive spoken commands from the user 204 via the speech utterance 206, and provide services in response to the commands via the voice based system 200. In some examples, the voice-enabled device 102 may detect a predefined trigger expression or word (e.g., "awake"), which may be followed by instructions or directives (e.g., "start the conference," "end the conference," "please end my phone call," "please turn off the alarm," etc.). Services provided by the voice-enabled device 102 in conjunction with the voice based system 200 may include performing actions or activities, rendering media, obtaining, and/or providing information, providing information via generated or synthesized speech via the voice-enabled device 102, initiating network-based services on behalf of the user 204, and so forth.

The voice-enabled device 102 may receive or capture sound corresponding to the speech utterance 206 of the user 204 via one or more microphones. In certain implementations, the speech utterance 206 may include or be preceded by a command that is spoken by the user 204 to indicate that subsequent user speech is intended to be received and acted upon by the voice-enabled device 102 and/or voice based system 200. The voice-enabled device 102 may detect the command and begin streaming audio signals to the voice based system 200. In some instances, the voice-enabled device 102 may operate in a low-functionality mode and analyze sound using automatic speech recognition processing. When the command is detected using automatic speech recognition, the voice-enabled device 102 may begin streaming the audio signal, and other data, to the voice based system 200. The command may be a reserved keyword that is detected locally by the voice-enabled device 102, such as by using an expression detector that analyzes audio signals produced by the microphones of the voice-enabled device 102 using automatic speech recognition techniques to detect the command. An example command can be a predefined word, phrase, or other sound. An expression detector may be implemented using keyword spotting technology, as an example. The keyword spotter can include an algorithm that evaluates an audio signal to detect the presence a predefined word or expression in the audio signal. Rather than producing a transcription of the words of the speech, a keyword spotter outputs a true/false value to indicate whether or not the predefined word or expression was represented in the audio signal.

In some embodiments, an expression detector of the voice-enabled device 102 may be configured to analyze the audio signal 214 to produce a score indicating a likelihood that a command is represented in the audio signal 214. The expression detector then compares the score to a threshold to determine whether the command will be declared as having been spoken. For instance, the automatic speech recognition techniques may involve using a Hidden Markov Model (HMM) recognizer that performs acoustic modeling of the audio signal and compares the HMM model of the audio signal to one or more reference HMM models that have been created by training for a specific trigger expression.

In the example illustrated in environment 202, the user 204 issues a speech utterance 206, which the voice-enabled device 102 detects or captures. The voice-enabled device 102 or another device may produce an audio signal 214 representing the speech utterance 206. As illustrated in FIG. 2A, the voice-enabled device 102 or another device may send the audio signal 214 to the voice based system 200. In some embodiments, the voice-enabled device 102 may further determine and/or generate, and send additional metadata to the voice based system 200 that may be used to determine or resolve various terms in the utterance 206. For instance, the types of metadata may include data regarding the information currently displayed on the additional device 212 (or an integrated display), snapshots which indicate device states of the voice-enabled device 102, etc. A snapshot may comprise device states which indicate current activities or operations of the voice-enabled device 102 before, during, and/or after the speech utterance 206 is detected by the voice-enabled device 102. Device states of the voice-enabled device 102 may include, for example, conducting a conference call, a telephone call, outputting an alarm sound, streaming audio (e.g., music, audio books, etc.), conducting a dialogue with the user 204, performing online searches, controlling appliances in an office or house, or any other type of activity for which a voice-enabled device 102 and/or a voice based system 200 can be configured to perform.

While the snapshots of the devices' states may be sent to the voice based system 200 when a speech utterance is detected 206, in other examples, the voice based system 200 may also store indications of device states rather than receiving them each time an audio signal 214 is received. For example, the voice based system 200 may receive an indication that the user 204 set an alarm and may store a time associated with the alarm. Thus, once the alarm is sounding, the voice based system 200 may already have the device state stored and does not receive the snapshots every time a speech utterance 206 is detected. Similarly, some or all of the metadata may be stored at the voice based system 200 prior to the speech utterance 206 being captured by the voice-enabled device 102.

In various examples, the audio signal 214 (and metadata or other associated information) may be sent to the voice based system 200 over one or more networks 230. The one or more networks 230 may include any viable communication technology, such as wired and/or wireless modalities and/or technologies. Networks 230 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, the voice based system 200 may include one or more processors and/or non-transitory computer-readable media. The voice based system 200 may implement various components for determining the intent of the user in making the utterance, and for generating a response to the user's utterance. In some embodiments, the voice based system 200 may implement an orchestrator 250 that calls or communicates with an automatic speech recognition (ASR) system 258, and a natural language understanding (NLU) system 260 for processing one or more audio signals 214. For example, the orchestrator 250 may stream the audio signal 214 to the automatic speech recognition system 258, which detects the speech utterance 206 endpoint and sends a message to the voice-enabled device 206 and/or conference location. In some instances, the automatic speech recognition system 258 of the voice based system 200 may process the one or more audio signals 214 to determine textual data which corresponds to the speech utterance 206. In some examples, the automatic speech recognition system 258 may generate automatic speech recognition confidence scores representing the likelihood that a particular set of words of the textual data matches those spoken in the speech utterance 206. For instance, the automatic speech recognition system 258 may determine a confidence or likelihood that a particular word which matches the sounds would be included in the sentence at the specified location (e.g., using a language or grammar model). Thus, each potential textual interpretation of the spoken utterance 206 (hypothesis) is associated with an automatic speech recognition confidence score. The automatic speech recognition system 258 may then return the textual data to the orchestrator 250.

In various examples, the textual data corresponding to the speech utterance 206 may be sent from the orchestrator 250 to the NLU system 260 to be analyzed or processed by the NLU system 260 to determine an intent expressed by the user 204 in the speech utterance 206. In addition, the orchestrator 250 may provide the NLU system 260 with metadata or other information regarding the context of current utterance 206. For example, if a display was presenting a list associated with a meeting, such as a media playlist, and the user issued a command to "play the first one," the orchestrator 250 can provide contextual data regarding the meeting-related list.

The arbitration service 270 may determine that a speech utterance, which may have been from multiple audio signals from different sources, is directed towards a particular voice-enabled device. One or more arbitration techniques may be used to select a particular voice-enabled device. The arbitration service can generate an ad-hoc group of multiple voice-enabled devices and/or additional devices based on conference call or meeting information. Any audio signals that are received from devices associated with the ad-hoc group can be processed to determine a particular voice-enabled device for the associated command. Additionally or alternatively, other arbitration techniques include using the time of when the audio signal was received and/or identifying that an audio signal was received from a particular user based on voice identification.

The orchestrator 250 may pass the intent to an execution service 262 to generate a response and/or perform an action based on the utterance. The execution service 262 may begin, join, or end a conference call. The execution service 262 may further include one or more domain speechlets which determine and generate a response for the voice-enabled device 102 to perform. In some examples, the execution service 262 may route identified intents to the appropriate speechlets. For example, the speechlets may be specialized software, domains, and/or devices for responding based on various intents, such as a conference domain, a music domain (e.g., a streaming music service), a video domain (e.g., a streaming video service), an organization domain (e.g., calendars, reminders, timers, alarms, etc.), and other types of domains. For example, an intent may include a command to begin or join a conference call, and the execution service 262 may route the intent to a conference domain speechlet configured to execute a begin or join a conference call command.

Once the execution service 262 has generated a response, the execution service 262 may provide the response 248 to the voice-enabled device 102 and/or the additional device 212. For example, the response 248 may include a confirmation, generated by a text to speech (TTS) system 264, that is presented to the user 204 as an audible confirmation that the user's command has been received. The response 248 may also or alternatively be a command to play media, a prompt for additional information, etc. The example commands and responses described herein are illustrative only, and are not intended to be limiting.

Figure 2B:
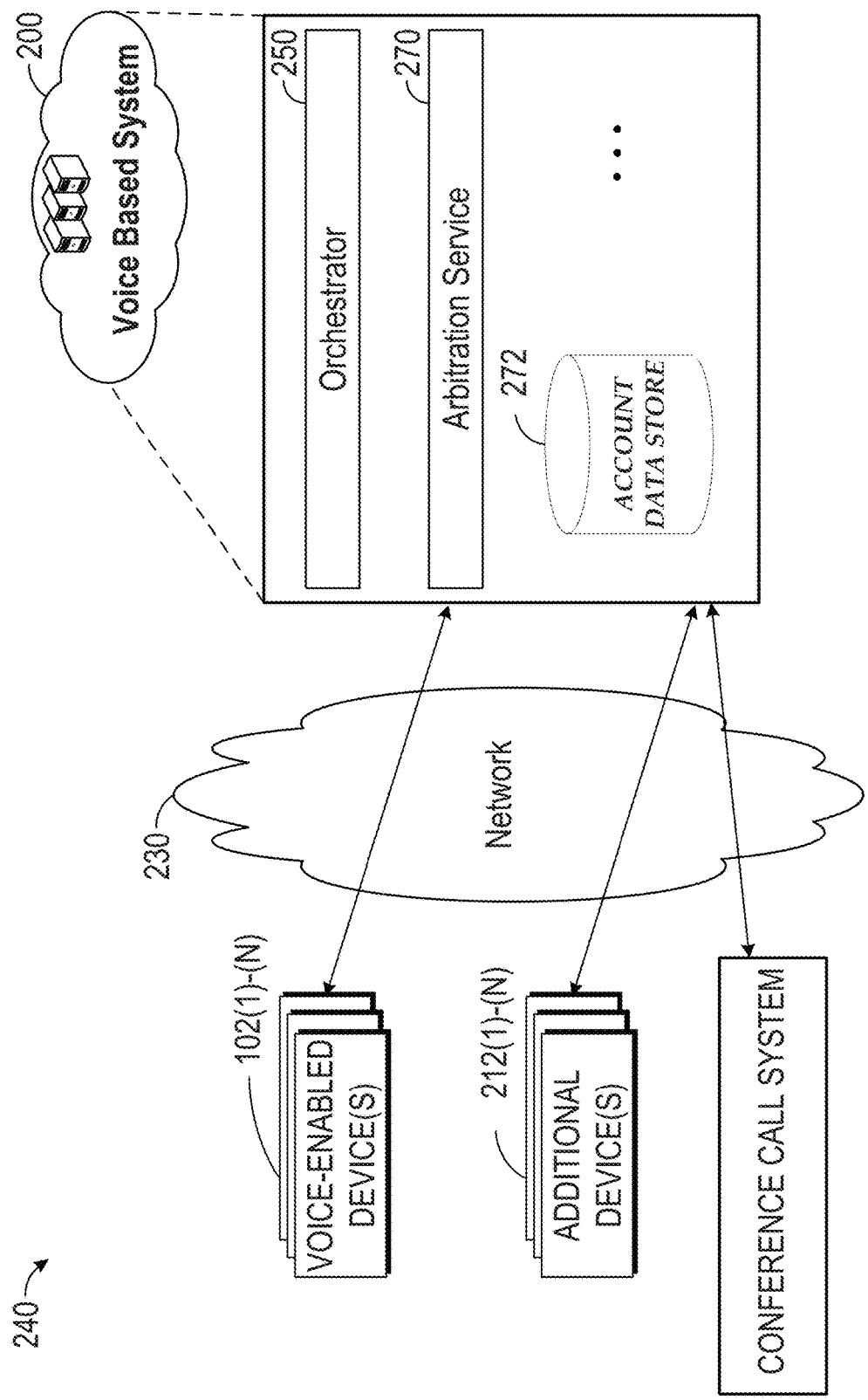
FIG. 2B is another schematic block diagram depicting an illustrative network environment for implementing a voice based system.

FIG. 2B is a schematic diagram of another illustrative environment 240, which may be similar to the environment 202 of FIG. 2A. For example, the components of the environment 240 of FIG. 2B may be the same or similar to the components of the environment 202 of FIG. 2A, such as the voice-enabled devices, additional devices, or the voice-based system. There can be multiple voice-enabled devices 102(1)-(N) and/or multiple additional devices 212(1)-(N) in multiple locations (e.g., different rooms of an office and/or multiple offices). The voice-enabled devices 102(1)-(N) and/or multiple additional devices 212(1)-(N) can be used to conduct a conference over the voice based system 200. Voice based system 200 can include various components such as an orchestrator 250, an arbitration service 20, and/or an account data store 272. The voice based system 200 of FIG. 2B can include other components such as any of the components of FIGS. 2A and/or 2C. As described herein, the voice based system 200 can communicate with a conference call system. The voice based system 200 can request information from the conference call system, such as a list of phone numbers that are connected to the conference call session, a list of device identifiers for voice-enabled devices that are connected to the conference call session, or a list of account identifiers for voice-enabled devices that are connected to the conference call session.

Figure 2C:
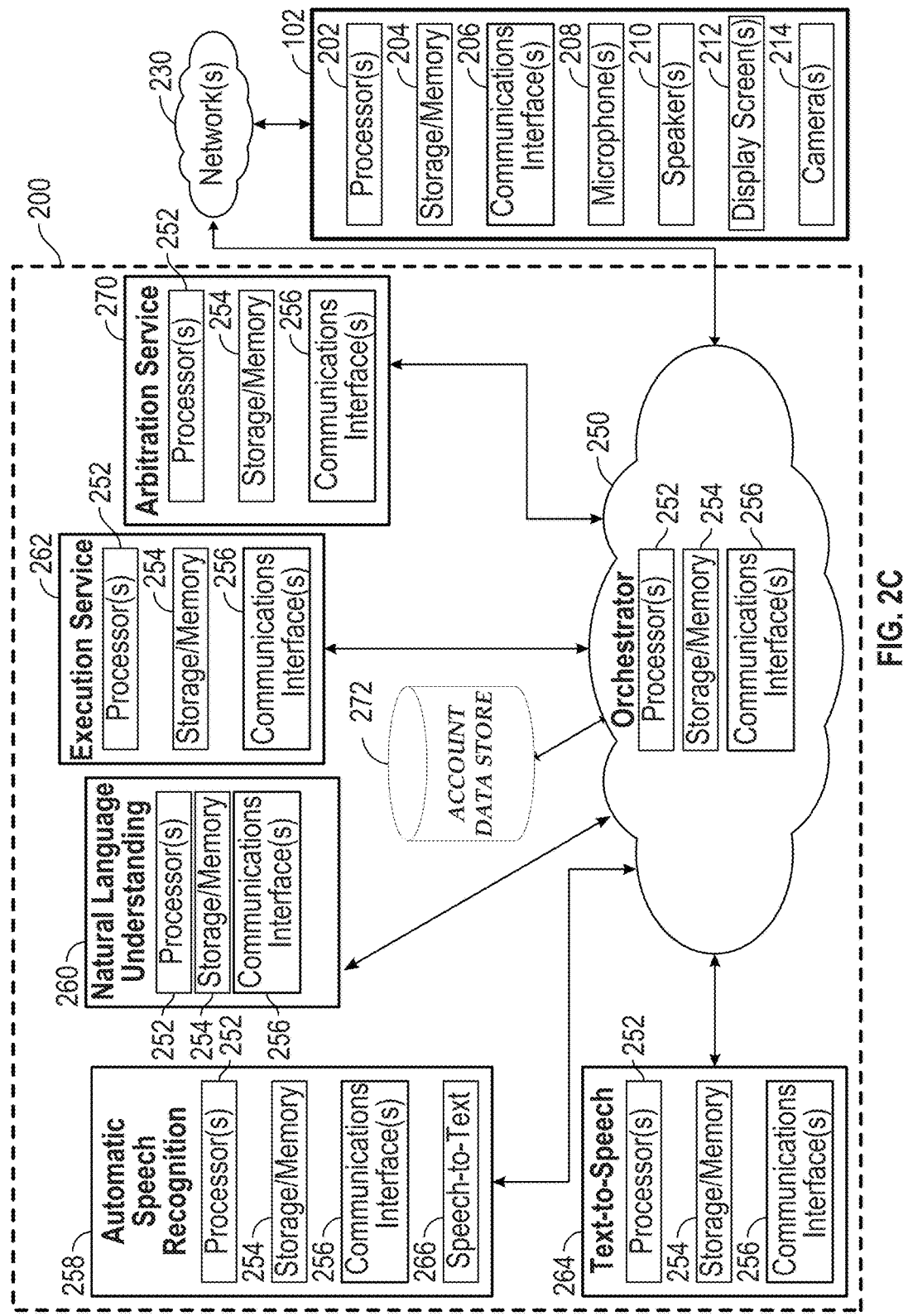
FIG. 2C is a schematic block diagram depicting an illustrative voice based system of the network environment depicted in FIG. 2A or 2B.

FIG. 2C is an illustrative diagram of the voice-enabled device 102 and/or the voice based system 200 architecture of FIGS. 2A and/or 2B, in accordance with various embodiments. A voice-enabled device 102 may, in some embodiments, include sound controlled functionality, such as one or more voice and/or sound activated components. In some embodiments, a voice-enabled device 102 may be configured to communicate with the voice based system 200 in response to detecting an utterance including a command. Similarly, a voice-enabled device 102 may alternatively or additionally include one or more manually activated components for manually activating a voice-enabled device 102. In this particular scenario, a voice-enabled device 102 may also be configured, in some embodiments, to communicate with the voice based system 200 in response to a manual input being detected by one or more input mechanisms, such as a touch screen, a button, and/or a switch, for example.

In a non-limiting embodiment, a voice-enabled device 102 may be capable of being activated in response to detecting a specific sound, such as a command, as well as, or alternatively, via one or more inputs. After detecting a specific sound (e.g., a trigger expression, such as a "wake word"), a voice-enabled device 102 may recognize commands (e.g., audible commands, inputs) within captured audio, and may perform one or more actions in response to the received commands. Furthermore, a voice-enabled device 102 may also be configured to perform one or more actions in response to detecting a particular touch, or mechanical, input(s) via a voice-enabled device 102.

A voice-enabled device 102 may correspond to any suitable type of electronic device that is configurable to stream or transmit audio input to a voice based system. Example voice-enabled devices 102 include, but are not limited to, a smart speaker, desktop computers, mobile computers (e.g., laptops, ultrabooks), mobile phones, smart phones, tablets, televisions, set top boxes, smart televisions, personal display devices, a user computing device, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, a voice-enabled device 102 may be relatively simple or basic in structure such that no, or a minimal number of, mechanical input option(s) (e.g., keyboard, mouse, track pad) or touch input(s) (e.g., touch screen, buttons) are included. For example, a voice-enabled device 102 may be able to receive and output audio, and may include power, processing capabilities, storage/memory capabilities, and communication capabilities. However, in other embodiments, a voice-enabled device 102 may include one or more components for receiving mechanical inputs or touch inputs, such as a touch screen and/or one or more buttons.

A voice-enabled device 102, in some embodiments, may include a minimal number of input mechanisms (e.g., a power on/off switch) such that functionality of a voice-enabled device 102 may solely or primarily be through audio input and audio output. For example, a voice-enabled device 102 may include, or be in communication with, one or more microphones that listen for a trigger expression by continually monitoring local audio. In response to the trigger expression being detected, a voice-enabled device 102 may establish a connection with the voice based system 200, send audio data to the voice based system 200, and await/receive a response from the voice based system 200. In some embodiments, however, non-voice/sound activated devices may also communicate with the voice based system 200. For example, in response to a button or touch screen being pressed, or a button or touch screen being pressed and held, a microphone associated with a voice-enabled device 102 may begin recording local audio, establish a connection with the voice based system 200, send audio data representing the captured audio to the voice based system 200, and await/receive a response, and/or execute an action, from the voice based system 200.

In some embodiments, the voice based system 200 is configured in a server cluster, server farm, data center, mainframe, cloud computing environment, or a combination thereof. To illustrate, the voice based system 200 may include any number of devices that operate as a distributed computing resource (e.g., cloud computing, hosted computing, etc.) that provides services, such as storage, computing, networking, and so on. The voice based system 200 may be located on a remote computing system with which an individual subscribes to a service on. While not illustrated in FIG. 2C, in some embodiments, the voice based system 200 may be located within a dedicated computing device instead of being implemented by multiple computing device as shown. In some embodiments, the voice based system 200 and/or aspects or components of the voice based system 200 can be embodied in a voice-enabled device 102. For example, to perform arbitration, a single voice-enabled device in a group of devices can act as a "master" device to determine which of the voice-enabled devices should execute a voice command. Conversely, the arbitration processes described herein can be implemented in a distributed manner among the group of voice-enabled devices.

A voice-enabled device 102 may include one or more processors 202, storage/memory 204, a network interface 206, one or more microphones 208 or other audio input devices (e.g., transducers), one or more speakers 210 or other audio output devices, a display screen 212, and/or one or more cameras 214 or other image capturing components. However, one or more additional components may be included within a voice-enabled device 102, and/or one or more components may be omitted.

In some embodiments, a voice-enabled device 102 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, a voice-enabled device 102 may be in communication with an additional device including one or more of: processor(s) 202, storage/memory 204, a network interface 206, microphone(s) 208, speaker(s) 210, display screen 212, and/or camera(s) 214. For example, a centralized control device of a voice-enabled device 102 may control one or more microphone(s) 208 and/or speaker(s) 210, such as in a conference setting.

Hardware processor(s) 202 may include any suitable processing circuitry capable of controlling operations and functionality of a voice-enabled device 102, as well as facilitating communications between various components within a voice-enabled device 102. In some embodiments, the processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 202 may include its own local memory, which may store program systems, program data, and/or one or more operating systems.

The non-transitory storage/memory 204 may include one or more types of storage mediums such as any volatile or non-volatile memory, or any removable or non-removable memory implemented in any suitable manner to store data for a voice-enabled device 102. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), RAID storage systems, or any other storage type, or any combination thereof. Furthermore, the storage/memory 204 may be implemented as computer-readable storage media ("CRSM"), which may be any available physical media accessible by the processor(s) 202 to execute one or more instructions stored within storage/memory 204.

In some embodiments, the storage/memory 204 may include one or more systems and/or databases, such as a speech recognition system, a trigger expression database, a sound profile database, and a trigger expression detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to the voice based system 200 for processing.

In some embodiments, sound profiles for different words, phrases, commands, or audio compositions are also capable of being stored within the storage/memory 204, such as within a sound profile database. For example, a sound profile of audio may be stored within the sound profile database of storage/memory 204 on a voice-enabled device 102. In this way, if a particular sound (e.g., a trigger expression or phrase) is detected, a corresponding command or request may be ignored, for example. A sound profile, for example, may correspond to a frequency and temporal decomposition of a particular audio file or audio portion of any media file, such as an audio fingerprint or spectral representation. In other embodiments, the sound profile may be stored in storage/memory of the voice based system 200.

In some embodiments, the storage/memory 204 and/or the voice based system 200 may store voice identification data associated with one or more individuals. For example, an individual that operates a voice-enabled device 102 may have a registered user account on the voice based system 200. In some embodiments, a voice-enabled device 102 may be associated with a group account or group, and various individuals may have user accounts that are operating under the rules and configurations of the group account. As an illustrative example, a voice-enabled device 102 may be associated with a first group account on voice based system 200. The first group account can be dynamically generated on the fly. As another example, the first group account can be for a family that lives at a household where a voice-enabled device 102 is located. Each family member may also have a user account that is linked to the first group account (e.g., a parent, a child, etc.), and, therefore, each user account may obtain some or all of the rights of the first group account. For example, a voice-enabled device 102 may have a first group account on the voice based system 200 registered to a particular family or group, and each of the parents and children of the family may have their own user account registered under the parent's registered account. In one illustrative embodiment, voice identification data for each individual may be stored by that individual's corresponding user account. The voice identification data, for instance, may correspond to a "voice fingerprint" or "voice model" of a particular individual, which may be a digital representation of a person's voice including a frequency decomposition of that individual's voice.

The communications interface 206 may include any circuitry allowing or enabling one or more components of a voice-enabled device 102 to communicate with one another, and/or with one or more additional devices, servers, and/or systems. For example, the communications interface 206 may facilitate communications between a voice-enabled device 102 and the voice based system 200. As an illustrative example, audio data representing an utterance (e.g., utterance 206 of FIG. 2A) may be transmitted over the network 230 to the voice based system 200 using any number of communications protocols. For example, the network(s) 230 may be accessed using Transfer Control Protocol and Internet Protocol ("TCP/IP") (e.g., any of the protocols used in each of the TCP/IP layers) and Hypertext Transfer Protocol ("HTTP"), are some of the various types of protocols that may be used to facilitate communications between a voice-enabled device 102 and the voice based system 200. Various additional communication protocols may be used to facilitate communications between a voice-enabled device 102 and voice based system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

A voice-enabled device 102 may also include one or more microphones 208 and/or transducers. Furthermore, one or more microphones located within a separate device may be in communication with a voice-enabled device 102 to capture sounds for a voice-enabled device 102. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, a voice-enabled device 102 may include multiple microphones (e.g., four, seven, ten, etc.) placed at various positions about a voice-enabled device 102 to monitor/capture any audio outputted in the environment where a voice-enabled device 102 is located. The various microphones 208 may include some microphones optimized for distant sounds, while some microphones may be optimized for sounds occurring within a close range of a voice-enabled device 102. In some embodiments, microphone(s) 208 may only begin to detect audio signals in response to a manual input to a voice-enabled device 102. For example, a manually activated device may begin to capture audio data using microphone(s) 208 in response to a user input, such as pressing a button, tapping a touch screen, or providing any touch input gesture to a touch input component.

A voice-enabled device 102 may include one or more speakers 210. Furthermore, a voice-enabled device 102 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where a voice-enabled device 102 may be located. In some embodiments, speaker(s) 210 may include headphones or ear buds, which may be wirelessly wired, or hard-wired, to a voice-enabled device 102, that may be capable of broadcasting audio directly to an individual.

The display screen 212 may correspond to a display device and/or touch screen, which may be any size and/or shape and may be located at any portion of a voice-enabled device 102. In some embodiments, the voice-enabled device 102 may include one or more cameras 214, corresponding to any suitable image capturing component or components capable of capturing one or more images and/or videos. The display screen 212 and/or the camera(s) 214 may be optional for a voice-enabled device 102. In some embodiments, contextual metadata may be obtained by computer vision analysis of an object detected by camera(s) 214.

In some embodiments, a voice-enabled device 102 may include an additional input/output ("I/O") interface. In some embodiments, the output portion of the I/O interface of a voice-enabled device 102 may include one or more lights, light emitting diodes ("LEDs"), or other visual indicator(s). Persons of ordinary skill in the art will recognize that, in some embodiments, one or more features of the output portion of the I/O interface may be included in a purely voice activated version of a voice-enabled device 102. For example, one or more LED lights may be included on a voice-enabled device 102 such that, when microphone(s) 208 receive audio, the one or more LED lights become illuminated signifying that audio has been received by a voice-enabled device 102. In some embodiments, one or more vibrating mechanisms or other haptic features may be included with a voice-enabled device 102 to provide a haptic response to an individual.

In some embodiments, a voice-enabled device 102 may include radio-frequency identification ("RFID") functionality and/or near field communication ("NFC") functionality. Furthermore, in some embodiments, a voice-enabled device 102 may include one or more infrared ("IR") sensors and one or more IR emitters. The IR sensors/emitters may be used to determine depth information. For example, in some embodiments, a distance of an individual from a voice-enabled device 102 may be determined using the one or more IR sensors/emitters. Depth determination may be performed using any depth determination technique. In some embodiments, a distance between an individual and a voice-enabled device 102 may be employed as a basis for presenting content with varying density using display screen 212. In some embodiments, a voice-enabled device 102 may include beaconing functionality that allows a voice-enabled device 102 to recognize when one or more devices are located nearby. For example, a voice-enabled device 102 may include beaconing detection functionality that generates a beaconing signal, and attempts to determine whether any devices nearby are capable of detecting that signal. If so, then that may indicate that a particular device is proximate to a voice-enabled device 102.

The voice based system 200 may include various subsystems, components, and/or modules including, but not limited to, an automatic speech recognition ("ASR") system or component 258, natural language understanding ("NLU") system or component 260, an execution service 262, text-to-speech ("TTS") system or component 264, an arbitration service 270, and/or an account data store 272. In some embodiments, the voice based system 200 may also include an orchestrator 250 system or component capable of orchestrating one or more processes to be performed by one or more of the ASR system 258, the NLU system 260, the execution service 262, the TTS system 264, and/or the arbitration service 270, as well as one or more additional components, devices, and/or systems associated therewith. The voice based system 200 may also include computer readable media, including, but not limited to, flash memory, random access memory ("RAM"), and/or read-only memory ("ROM"). The voice based system 200 may also include a speaker identification service capable of identifying a particular user based on speech input. The voice based system 200 and/or the components thereof may include one or more processor(s) 252, storage/memory 254, and a communications interface 256. The processor(s) 252, storage/memory 254, the communications interface 256, and the account data store 272 may, in some embodiments, be substantially similar to the processor(s) 202, storage/memory 204, and the communications interface 206, which are described in greater detail above, and the aforementioned descriptions may apply.

The ASR system 258 may be configured to recognize human speech in detected audio, such as audio captured by a voice-enabled device 102, which may then be transmitted to voice based system 200. In some embodiments, the ASR system 258 may include speech-to-text ("STT") system 266. STT system 266 may employ various speech-to-text techniques.

The ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of the storage/memory 254. For example, the input audio data may be compared with models for sounds (e.g., sub-word units or phonemes) and sequences of sounds to identify words that match the sequence of sounds spoken in the utterance of the audio data.

The NLU system 260 may be configured such that it determines an intent of an utterance based on the received audio data. The NLU system 260 may determine one or more domains, which may also be referred to as categories, that may be capable of handling the intent of the utterance. In some embodiments, to determining an utterance's intent, the NLU system 260 may communicate with execution service 262 to cause one or more specific functionalities to be accessible, perform one or more tasks, and/or retrieve an appropriate response or response information.

To correctly perform natural language understanding processing of speech input, the NLU system 260 may be configured to determine a domain of an utterance. By determining the domain, NLU system 260 may narrow down which services and functionalities offered by an endpoint device (e.g., a voice-enabled device 102, voice based system 200, or any other electronic device or system) may be relevant. For example, an endpoint device may offer services relating to interactions with a conference service, a telephone service, a contact list service, a calendar/scheduling service, a music player service, etc. Words in a single text query may implicate more than one service, and some services may be functionally linked (e.g., both a conference service and a calendar service may utilize data from the contact list).

The output from the NLU system 260 (which may include tagged text, commands, etc.) may then be sent to the orchestrator 250 and/or a command processor, which may be located on, or may be in communication with, the voice based system 200. The destination command processor may be determined based on the output of NLU system 260.

The execution service 262 may, for example, correspond to various action specific applications, which are capable of processing various task specific actions and/or performing various functionalities. The execution service 262 may further correspond to first party applications and/or third party applications capable of performing various tasks or actions, or performing various functionalities. For example, based on the context of the audio received from a voice-enabled device 102, the voice based system 200 may use a certain application to generate a response, or to obtain response information, which in turn may be communicated back to a voice-enabled device 102 and/or to another electronic device (e.g., a speaker or conference system).

The accounts data store 272 may store one or more accounts or user profiles, corresponding to users having an account on voice based system 200. In some embodiments, the account data store 272 may store a voice signal, such as voice identification information, for a specific user profile. This may allow speaker identification techniques to be used to match a voice to voice identification data associated with a specific user profile. In some embodiments, the account data store 272 may store a telephone number associated with a particular user profile and/or voice-enabled device.

The arbitration service 270, using the techniques described in further detail herein, can determine that a speech utterance, which may have been received multiple audio signals from different sources, is directed towards a particular voice-enabled device.

Figure 3:
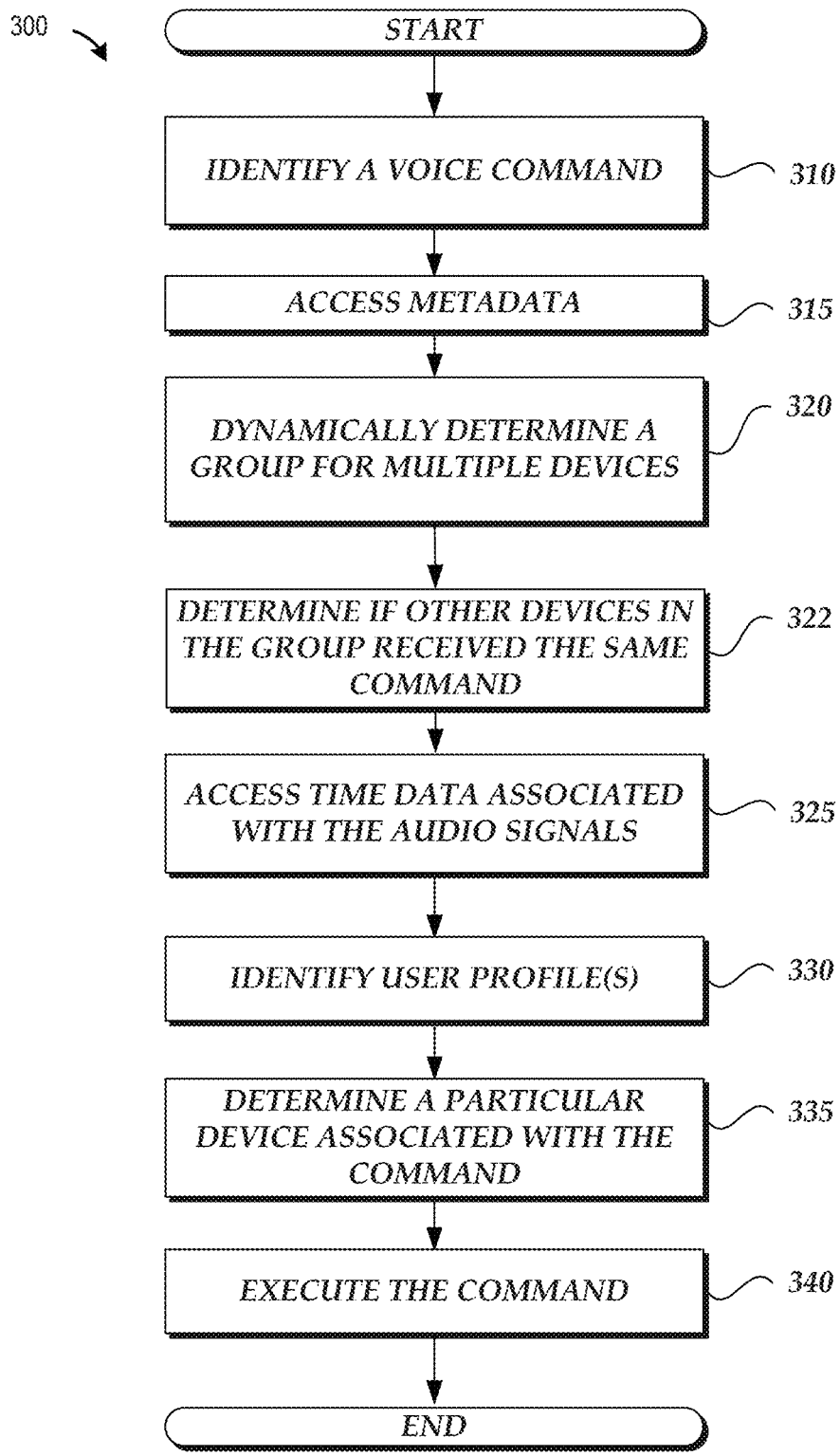
FIG. 3 is a flow diagram depicting an example method for arbitrating voice commands.

FIG. 3 is a flow diagram depicting an example method 300 for arbitrating voice commands. The method 300 can be implemented by a voice based system, such as the voice based system 200. For example, some of the blocks of the method 300 may be implemented by components of the voice based system 200, such as the arbitration service 270, the execution service 262, other components of the voice based system 200, and/or some combination thereof.

At block 310, an audio signal can be received and/or processed. One or more voice-enabled devices, microphones, or conference devices may transmit an audio signal to the voice based system 200. In some embodiments, a voice-enabled device may cause audio input to be captured until a pause of suitable duration is detected; until the voice based system 200 instructs the device to stop; until a particular duration has been reached for the captured audio; or until a voice command, button press, gesture, or other suitable user interaction is received to end the voice capture. The devices can also transmit metadata associated with the audio signal. The metadata can include an identifier for the voice-enabled device, a time that the audio input was received, or a time that the audio signal was generated. The voice based system 200 can perform automatic speech recognition and/or natural language understanding to identify a command, as described herein.

At block 315, metadata can be accessed. The voice based system 200 can determine metadata, such as event, meeting, location, and/or conference call information associated with the voice-enabled device. For example, the voice based system 200 can determine a location or room of the voice-enabled device. The voice based system 200 can determine a meeting scheduled for that location or room. The voice based system 200 can pull conference call credentials from the meeting information. The voice based system 200 can access any other data associated with an organization. The voice based system 200 may use an Application Programming Interface (API) to query any of the metadata described herein, where applicable, based on an input parameter, such as an identifier for the voice-enabled device and/or an event identifier. Example metadata can also include user profile data or an energy level of an audio signal. Additional examples of metadata are described in further detail herein.

At block 320, a group of multiple devices can be dynamically determined. For example, the arbitration service 270 may dynamically determine a group of voice-enabled devices on the fly for arbitration purposes. While block 320 is shown after the previous blocks 305, 310, 315, in some embodiments, block 320 may occur before any of those blocks. The arbitration service 270 may dynamically determine the group based on metadata that can include conference call session data, event data, and/or voice identification data. In some embodiments, a group of device identifiers can be generated. The voice based system 200 can store the generated group data in the account data store 272. Additional information regarding dynamic group determination is described in further detail herein, such as with respect to FIGS. 4, 5, and 8.

At block 322, multiple audio signals can be received from different devices. One or more voice-enabled devices, microphones, or conference devices may transmit multiple audio signals to the voice based system 200. The devices can also transmit metadata associated with the audio signals. The metadata can include an identifier for the voice-enabled device, a time that the audio input was received, or a time that the audio signal was generated.

In some embodiments, multiple voice-enabled devices may be assigned to a group or session (e.g., a group or session for a conference call) as described herein. The same command can be determined to have been received from the same session within a threshold period of time. For example, the voice based system 200 can receive many audio signals from disparate, unrelated voice-enabled devices within a period of time. Following identification of a voice command by the voice based system 200 from a voice-enabled device from a group, the system 200 can check for other audio signals that are also received from different voice-enabled devices from the same group. The other audio signals that are received from the same group can potentially correspond to the same voice command. Accordingly, the voice based system 200 uses group or session data to determine that the same command received from multiple devices correspond to the same group or session, which may require arbitration as described herein.

Once a voice command is received from a group, the voice based system 200 can listen for commands from the same group and/or can determine if other devices in the same group received the same command. The voice based system 200 can restrict monitoring for the same command within the same group within a threshold period of time from when the first voice-enabled device received the command. For example, the voice based system 200 can identify a voice command from a first voice-enabled device. The voice-based system can determine that a second voice-enabled device in the same group as the first voice-enabled device received the voice command. The determination that another device received the same command can be can further be based on receipt by the second voice-enabled device being within a threshold period of time of receipt of the voice command by the first voice-enabled device.

At block 325, time data associated with the audio signals can be accessed. For example, the voice based system 200 can access time data associated with the received audio signals, such as the time the audio signal was generated from the voice-enabled device or the time the audio signal was received by the voice based system 200. Example time data includes timestamps that can represent time in milliseconds or microseconds. Additional information regarding the use of time data for arbitration is described in further detail herein, such as with respect to FIG. 7.

At block 330, a user profile can be identified. For example, a speech processing system can process the audio signals to identify a user profile. An example approach to voice identification can include comparison of portions of an audio signal from a training mode to a baseline signal and the differences can be stored as or in a user profile. When the audio signal is received, the speech processing system can compare the audio signal to the baseline signal and determine if the differences correspond to the stored user profile. Other user profile identification techniques are described in further detail herein. Additional information regarding user profile identification are described in further detail herein, such as with respect to FIGS. 8 and 9.

At block 335, a particular device can be determined to be associated with the command. For example, the arbitration service 270 can use the data from the previous blocks to determine that a particular device is associated with the command. A particular device can be selected from among the group of devices that received the same command or instead of another device that received the same command. The arbitration service 270 can identify a particular device from a group of devices that received the same command with the highest energy level; within a particular energy band; based on event data; based on time data; or that is associated with a particular user profile; and/or some combination thereof. Additional information regarding arbitration are described in further detail herein, such as with respect to FIGS. 4, 7, and 8.

While the previous blocks 320, 325, 330 are shown in the same method 300, in other embodiments, an arbitration method may perform one of the blocks or a subset of the blocks 320, 325, 330. For example, the arbitration service 270 does not necessarily need to perform each of the dynamic group determination block 320, the time data block 325, or the user profile identification block 330, but may perform one of those blocks or a subset of them, as described herein.

In some embodiments, a particular voice-enabled device can be identified by emitting tones to voice-enabled devices in a meaningful way where the far sides receive those tones and the near sides are sequestering those tones. The tones may be coming from the speakers of the near sides in a way that when the voice based system 200 receives the tones and the command, the command can be ignored; conversely, the voice based system 200 can execute that command if the tone is not received by the voice-enabled device and/or the voice based system 200.

At block 340, the command is executed. For example, the execution service 252 may execute the command that was associated with a particular device. The execution service 252 can execute a "leave the conference call" command for a particular location associated with the identified voice-enabled device, which may allow other conference participants at other locations to continue participating in the conference call. The "leave the conference call" command can cause a voice-enabled device to disconnect from a conference call. The execution service 252 can execute other commands that have been determined to be associated with a particular voice-enabled device. As described herein, the voice based system 200 can cause the determined voice-enabled device to play media, such as media associated with a conference call or meeting.

Particular embodiments of the voice based system 200 can communicate with thousands, hundreds of thousands, or millions of voice-enabled devices that are each associated with unrelated users or organizations and can receive audio signals from those devices periodically or continuously. Accordingly, the voice based system 200 may dynamically create groups of devices for arbitration purposes since arbitrating between all of the devices configured to communicate with the voice based system 200 may be impracticable otherwise due to the sheer volume of audio signals that are received at any time.

Figure 4:
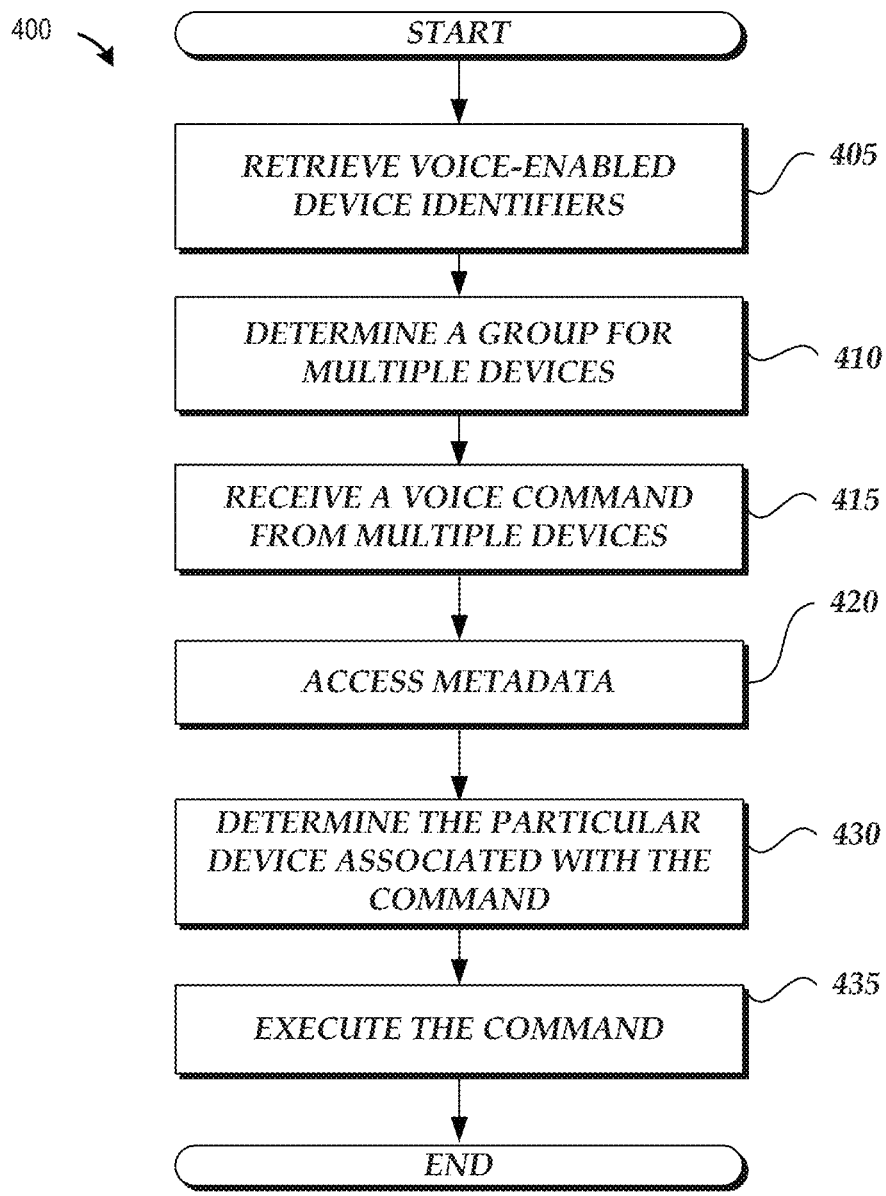
FIG. 4 is a flow diagram depicting an example method for arbitrating voice commands based on ad-hoc group determination.

FIG. 4 is a flow diagram depicting an example method 400 for arbitrating voice commands based on ad-hoc group determination. The method 400 can be implemented by a voice based system, such as the voice based system 200. For example, some of the blocks of the method 400 may be implemented by components of the voice based system 200, such as the arbitration service 270, the execution service 262, other components of the voice based system 200, and/or some combination thereof.

At block 405, voice-enabled device identifiers are retrieved. For example, the voice based system 200 can retrieve multiple voice-enabled device identifiers from a conference call session where each of the corresponding devices are connected to the same conference call. In some embodiments, a conference call system can maintain information that indicates the voice-enabled devices that are connected to a particular conference call (e.g., a list of phone numbers that are connected to the conference call, a list of device identifiers for voice-enabled devices that are connected to the conference call, a list of account identifiers for voice-enabled devices that are connected to the conference call, or another type of information). The voice based system 200 can query the conference call system for active conference calls and/or for voice-enabled device identifiers that are connected to conference calls. The voice based system 200 may use an Application Programming Interface (API) to retrieve a conference call session or conference call bridge, which may include the voice-enabled device identifiers connected to the conference call or bridge. As another example, the voice based system 200 can retrieve multiple voice-enabled device identifiers from event data. Additional details regarding retrieving voice-enabled devices from event data are described in further detail herein, such as with respect to FIG. 5.

At block 410, a group can be generated or determined for multiple devices. For example, the voice based system 200 can generate a group of multiple voice-enabled device identifiers retrieved from the previous block. The voice based system 200 can store the group in the account data store 272. Each group can have a group identifier. On a periodic basis, the voice based system 200 can create groups of voice-enabled device identifiers for conference calls, such as for active conference calls. In some embodiments, the voice based system 200 can use a mechanism to identify stale groups. For example, the groups can be stored with an additional identifier, such as a timestamp or incremented number, such that older groups can be ignored based on timestamps being older than a certain period or based on a number identifier being less than a threshold number. In some embodiments, a group can be associated with a time to live.

In some embodiments, each individual group can be stored in a particular data structure format, such as an array list, a linked list, a hash set, a hash map, and/or some combination thereof. The data structures may be retrieved based on the entries in the group, such as by the voice-enabled device identifier.

In some embodiments, the voice based system 200 can update groups as new voice-enabled devices join a session or conference call. The voice based system 200 can retrieve, from the conference call session or some other source, an updated list of voice-enabled device identifiers. The updated list of voice-enabled device identifiers can include a new voice-enabled device identifier not already present in an existing group. The voice based system 200 can generate an updated group using the updated list of voice-enabled device identifiers such that the updated group indicates that a new voice-enabled device has been added to the session or conference call. In some embodiments, a group can be updated on a periodic basis. The voice based system 200 can retrieve, from the conference call session, an updated list of voice-enabled device identifiers after an elapsed period of time to potentially update a group. Thus, in some embodiments, a group can have a time to live and active conference call sessions can be polled after a period of time has elapsed, such as every minute.

With an updated group, the voice based system 200 can receive new voice commands where each voice command is associated with a voice-enabled device identifier. For arbitration purposes, the voice based system 200 can identify, from the new voice commands, a subset of voice commands. Specifically, the voice based system 200 can identify the subset of voice commands by identifying a voice command with a respective voice-enabled device identifier that is present in the updated group. As described herein, the voice based system 200 can ultimately execute at least one command from the subset of commands.

At block 415, a voice command from multiple devices can be received. For example, the voice based system 200 can receive audio signals from multiple voice-enabled devices. The audio signals may be received from many different unrelated voice-enabled devices. As described herein, voice commands can be determined from the audio signals using automatic speech recognition and/or natural language understanding.

As described herein, a first room or location can include a first voice-enabled device. A second room or location can include a second voice-enabled device and a speaker device separate from the second voice-enabled device. The second voice-enabled device can be configured to generate an audio signal from voice input in response to receiving a sound wave emitted from the speaker device in the second room or location. The sound wave can be a reproduction of the voice input of the conference call participant in the first room. The speaker device can provide audio in the second room or location from the conference call.

The same command can be determined to have been received and/or originated from the same group. For example, the arbitration service 270 can determine that the same command was received from multiple devices from the same group. For example, the voice based system 200 can receive many audio signals from disparate, unrelated voice-enabled devices within a period of time. Accordingly, the arbitration service 270 can retrieve one or more groups based on the voice-enabled device identifiers associated with each of the commands and determine if multiple commands correspond to the same group.

Once a voice command is received from a group, the voice based system 200 can listen for commands from the same group. The voice based system 200 can restrict monitoring for the same command within the same group within a threshold period of time from when the first voice-enabled device received the command. For example, the voice based system 200 can identify a voice command from a first voice-enabled device. The voice-based system can determine that a second voice-enabled device in the same group as the first voice-enabled device received the voice command. The determination that another device received the same command can be can further be based on receipt by the second voice-enabled device being within a threshold period of time of receipt of the voice command by the first voice-enabled device.

The voice based system 200 can retrieve one or more groups based on a voice-enabled device identifier as input. In some embodiments, the groups can be indexed by voice-enabled device identifier. The arbitration service 270 can compare commands that were received within a threshold period of time, such as within one or two seconds. In some embodiments, the arbitration service 270 can further compare the audio signals for each of the respective commands to see if the corresponding speakers may be different. For example, two different users that are part of a conference call may each speak the same command (e.g., "leave the conference") within the threshold period of time. Accordingly, the arbitration service 270 can determine that the two commands are distinct and not duplicates of another. In some embodiments, the arbitration service 270 can compare the audio signals to see if there is a degree of variation over a particular threshold. Additionally or alternatively, the arbitration service 270 can use voice identification of the audio signal to differentiate between the same command uttered by different users.

At block 420, metadata can be accessed. The voice based system 200 can access an energy level(s) of the audio signals. An energy level of an audio signal can be in a unit measurement, such as decibels (dB), per unit of time. An energy level can be represented as a spectrogram that represents the amplitude of the audio signal in one axis. In some embodiments, the voice based system 200 can calculate an energy level of an audio signal using any known technique. For example, the voice based system 200 can perform a Fourier transform, such as a fast Fourier transform, on the audio signal to convert waveform data in the time domain into the frequency domain. In other embodiments, an energy level can be determined by another service or device different from the voice based system 200. As described herein, the voice based system 200 can access other metadata.

At block 430, a particular device can be determined to be associated with the command. For example, the arbitration service 270 can arbitrate between the multiple devices, i.e., identify a particular device from the group that received the same command. The arbitration service 270 can select a first voice command out of multiple voice commands based at least in part on a first energy level associated with the first voice command and respective energy levels associated with one or more other commands. Each of the voice commands can be associated with a respective audio signal that as an energy level. In a conference setting, a user makes a speech utterance that is captured by a microphone where the respective audio signal can have an energy level and/or a sound profile of the user being in the room. In that conference setting, that audio can be reproduced at other conference locations; however, the audio signals received from those other locations may have a different energy level and/or sound profile than the original speech utterance.

In some embodiments, the arbitration service 270 can select the particular voice-enabled device that had an audio signal within a particular energy band. For example, human talking can have an energy level within a particular range in contrast to reproduced audio over a speaker system that can have an energy level within a different range. The arbitration service 270 can select the voice command with an energy level that is closest to an energy level within the range of human speech. The arbitration service 270 can determine that a first energy level corresponds to an energy level band and can further determine that other respective energy levels do not correspond to the energy level band. The arbitration service 270 can determine that a first energy level is within an energy level band and can further determine that other respective energy levels are not within the energy level band. If there are three or more conference locations, the arbitration service 270 can select the voice command from the location that has an audio signal that is different from and/or the outlier as compared to the other audio signals from the other locations. In other words, the originating audio signal will have a different energy or sound profile in contrast to the other audio signals from the other locations.

In some embodiments, the arbitration service 270 can apply arbitration logic that selects the particular voice-enabled device that had a corresponding audio signal with a higher energy level than another audio signal. In some settings where there are multiple voice-enabled devices and/or microphones, a user's speech may be picked up loudest or with a highest energy level by a voice-enabled device and/or microphone that is closest to the user. Thus, a particular voice-enabled device can be resolved based on a higher energy level of an audio signal over the energy level of another audio signal. In some embodiments, since energy level can be measured per unit of time, the highest energy level can be a maximum, an average, or some other statistical measurement. For example, the highest maximum decibel value for an audio signal can be used for arbitration purposes; and/or the highest average decibel value can be used for arbitration purposes.

At block 435, the command is executed. For example, the execution service 252 may execute the command that was determined to be associated with the particular voice-enabled device. The execution service 252 can execute a "leave the conference call" command for the particular location associated with the identified voice-enabled device, which may allow other conference participants at other locations to continue participating in the conference call. The execution service 252 can execute other commands that have been determined to be associated with the particular voice-enabled device. Where a particular device has been selected, the command can be executed for the particular voice-enabled device instead of the other voice-enabled device that received the same command.

Figure 5:
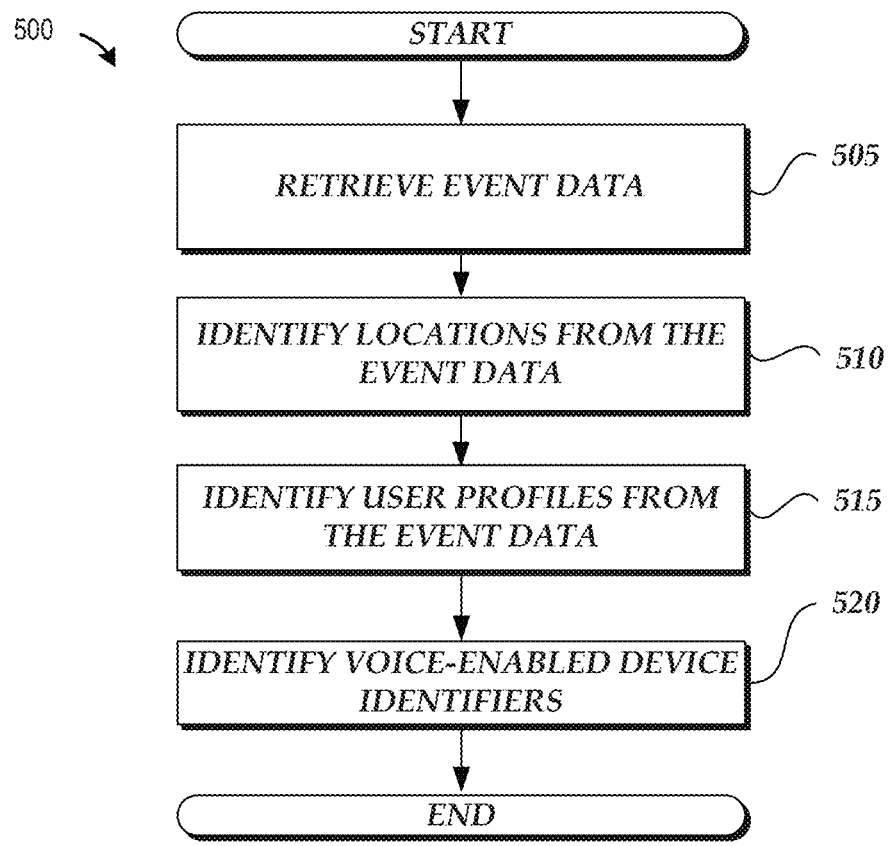
FIG. 5 is a flow diagram depicting an example method for determining voice-enabled devices based on event data.

FIG. 5 is a flow diagram depicting an example method 500 for determining voice-enabled devices based on event data. Some blocks of the method 500 can be used by other methods described herein, such as the method 400 of FIG. 4. In particular, blocks 505, 510, 515, 520 can be performed at block 405 of FIG. 4 where the method 400 can result in arbitration among multiple voice-enabled devices. The method 500 can be implemented by a voice based system, such as the voice based system 200. For example, some of the blocks of the method 500 may be implemented by components of the voice based system 200, such as the arbitration service 270, other components of the voice based system 200, and/or some combination thereof.

At block 505 event data is retrieved. For example, the voice based system 200 can retrieve event data associated with the meeting involving multiple locations. The voice based system 200 can retrieve event data from an event server, such as a calendaring server. Example event data can include, but is not limited to, one or more user identifiers (such as participants or an organizer), conference call information, and/or one or more location identifiers. Example event data can include a meeting invite. In some embodiments, event data is retrieved using an application programming interface (API) of the event server. For example, the voice based system 200 can generate an event retrieval request; transmit the event retrieval request to the event server; and receive, from the event server, the event data corresponding to the event retrieval request. In some embodiments, the voice based system 200 actively queries an event server to determine upcoming events that may involve a conference call and/or may generate groups of devices, as described herein, in advance of the events. Additional information regarding event data are described in further detail herein, such as with respect to FIG. 6.

In some embodiments, the application programming interface (API) for the event server can be queried in a number of different ways. A calendar can be retrieved based on input parameters such as a calendar identifier, a start date and/or time, and/or an end date and/or time. The output calendar can include single event instances, such as a single meeting, which can further include event identifiers. An event can be retrieved based on input parameters such as a calendar identifier, an event identifier, a start date and/or time, and/or an end date and/or time. For example, a single event can be retrieved based on an event identifier. As another example, multiple event instances corresponding to reoccurring event can be retrieved based on an event identifier, a start date, and an end date.

At block 510, one or more locations can be identified from the event data. For example, the voice based system 200 can retrieve, from the event data, one or more location values, such as a location identifier. The one or more location values from the event data can indicate one or more locations where the corresponding event, such as a meeting or teleconference call, is scheduled to take place. Additional information regarding retrieving location values from event data are described in further detail herein, such as with respect to FIG. 6.

At block 515, one or more user profiles can be identified from the event data. For example, the voice based system 200 can retrieve, from the event data, one or more user profile identifiers. The one or more user profile identifiers from the event data can indicate one or more users that are scheduled and/or have been invited to attend or participate in the event. Additional information regarding retrieving user profile identifiers from event data are described in further detail herein, such as with respect to FIG. 6.

At block 520, voice-enabled devices identifiers can be identified. For example, the voice based system 200 can determine one or more voice-enabled device identifiers. The voice based system 200 can retrieve a voice-enabled device identifier for a device at a location corresponding to a location value, such as a location identifier. If there are multiple location values from the event data, the voice based system 200 can retrieve a respective voice-enabled device identifier for each of the location values. To retrieve the voice-enabled device identifier, the voice based system 200 can access one or more associations between a respective location value and a respective voice-enabled device. The associations can be stored in a data store of the voice based system 200. The identified voice-enabled device identifiers can be used for arbitration purposes, such as generating a group, arbitrating between multiple voice commands, and/or executing a particular voice command, which is described in further detail herein, such as with respect to FIG. 4.

In some embodiments, the voice based system 200 can store a device profile for a voice-enabled device. The device profile can include or reference location values, such as a location identifier. A location value can represent any name, nickname, coordinate, or other data value for a particular location. For example, a location value may represent a particular room in a building or on a campus that includes multiple rooms. As another example, a location value may represent a particular conference room, office, or other space within a particular office building. As a further example, a location value may represent a particular room or area within a particular residence. Accordingly, the voice based system 200 can query voice-enabled device identifiers based on a location value or identifier.

A location value can be automatically assigned by the voice based of 200, can be based on user input, or some combination thereof. In some embodiments, the location values may be determined without necessarily requiring user input, e.g., based (at least in part) on automatic geolocation techniques, such as using a global positioning system (GPS) sensor associated with a voice-enabled device, network location techniques, and so forth. Additionally or alternatively, the location values may be set by user input from an administrator, e.g., using a management console for administration of the voice-enabled devices. In some embodiments, a location value for a device profile may be configured based (at least in part) on voice input captured using the corresponding device. For example, in conjunction with a spoken command such as "set the location . . . " or "add this device to . . . ," the voice based system 200 may determine that any terms following the command may represent the location of the device. In some embodiments, the user may be prompted to supply the location value for the device after attempting to invoke functionality that is dependent on a location value. For example, if the user issues a command to schedule a conference, then the voice based system 200 may cause the voice-enabled device to output a request for a location value if the value is not already set.

In some embodiments, a voice-enabled device identifier can be determined based on user profile data. For example, the voice based system 200 can retrieve, from the event data, a user profile identifier. The voice based system 200 can retrieve a user profile for the user profile identifier. For example, a user associated with the user profile can be scheduled to attend the event, such as a meeting or conference call. The voice based system 200 can identify a particular voice-enabled device identifier from an entry in the user profile. The entry can indicate that the particular voice-enabled device is registered to the user profile. In other embodiments, the voice based system 200 can identify a location identifier from a location property in the user profile. For example, if the user profile indicates that a user works in a particular office and the office has a voice-enabled device associated with it (such as in the case where the office has a single conference room), the voice based system can retrieve the voice-enabled device identifier corresponding to the device in the user's office.

FIG. 6 depicts example event data 600. The example event data may correspond to one or more data formats. The example format of the event data 600 may correspond to a JavaScript Object Notation (JSON) data format. The event data 600 may be illustrative and may not conform exactly to one or more particular data formats. Moreover, the event data may be XML, HTML, text, or any other data format. The event data 600 may be returned in response to a query to an event server, such as a calendaring server. The event data 600 may correspond to a meeting and/or a meeting invite.

As shown, the event data 600 includes an event identifier, a start date and/or time, an end date and/or time, an organizer, one or more participants, and one or more locations. As described herein, the voice based system 200 may use the user profile identifiers, such as "john.doe," "jane.evans," and "bob.smith," to access a corresponding user profile. As described herein, the voice based system 200 may use the location identifiers, such as "NYC-RM-312," "LA-2-FLR," and "SF-RM-Avalon," to identify corresponding voice-enabled devices located at the locations indicated by the location identifiers. The particular identifiers in the event data 600 are illustrative and any other type of identifier may be used by the voice based system 200. In some embodiments, the event data 600 includes more or less data been shown.

The term "identifier," as used herein, refers to any reference number, string, and/or randomized string or number. An example identifier includes a Globally Unique Identifier ("GUID"). In some embodiments, unique identifiers and/or GUIDs may not be guaranteed to be unique; however, the chances of a repeating unique identifier may be extremely low and/or negligible due to their implementation. For example, a unique identifier may be generated from random or pseudorandom numbers with 122 random bits such that the total number of unique identifiers is $2^{122}$. Thus, the unique identifiers are so large that the probability of the same number being generated randomly and/or pseudo-randomly twice is negligible. In some embodiments, shorter and/or longer identifiers may be used.

In further embodiments, the voice based system 200 can arbitrate among various voice commands based on the transmission delay of an audio system to duplicate an utterance in a first location at a second location. Conference systems can have an inherent delay to transmit audio, such as on the order of 1000 milliseconds to 2000 milliseconds, for example, depending on the underlying transmission technology and/or the physical distance between the endpoint locations. Accordingly, arbitration can be performed based on this time delay.

Figure 7:
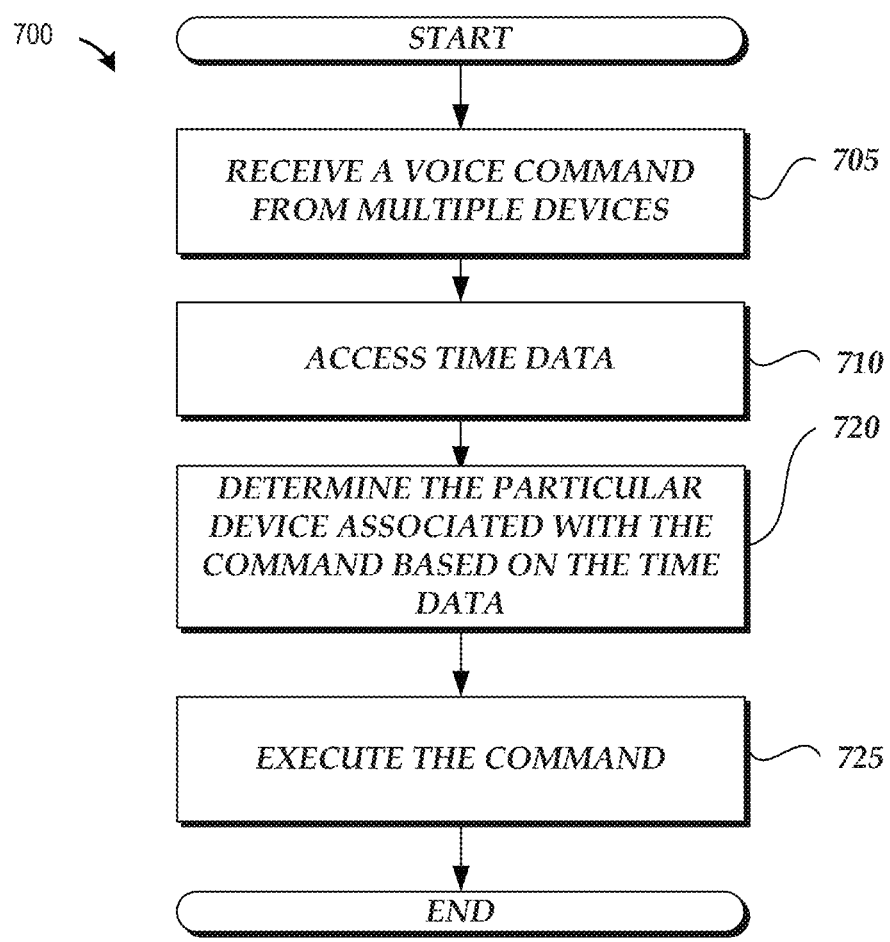
FIG. 7 is a flow diagram depicting an example method for arbitrating voice commands based on time data.

FIG. 7 is a flow diagram depicting an example method 700 for arbitrating voice commands based on time data. The method 700 can be implemented by a voice based system, such as the voice based system 200. For example, some of the blocks of the method 700 may be implemented by components of the voice based system 200, such as the arbitration service 270, the execution service 262, other components of the voice based system 200, and/or some combination thereof.

At block 705, a voice command from multiple devices can be received. For example, the voice based system 200 can receive audio signals from multiple voice-enabled devices. Voice commands can be determined from the audio signals using automatic speech recognition and/or natural language understanding. Thus, the voice based system 200 can identify a voice command for a voice-enabled device. As described herein, an arbitration issue can arise where a conference system includes voice-enabled devices and additional devices, such as additional microphones and/or speakers. An utterance by user and a first location directed towards a first voice-enabled device at the first location can be reproduced by the conference system, which can include another microphone at the first location, and output by a speaker at a second location, which can be separate from a second voice-enabled device at a second location. Thus, the second voice-enabled device at the second location can receive a reproduction of the speech utterance from the first location and can transmit the audio signal of the duplicated speech utterance to the voice based system 200.

The same command can be determined to have been received and/or originated from the same group. As described herein, the voice based system 200 can receive many audio signals from disparate, unrelated voice-enabled devices within a period of time. Accordingly, the arbitration service 270 can determine that the same command was received from multiple devices from the same group using any of the methods described herein. Additional information regarding the determination of groups is described in further detail herein, such as with respect to FIGS. 3, 4, 5, and 8. Further, as described herein, the voice based system 200 may further determine that the same voice command was received within a threshold period of time, such as by determining that a first timestamp and a second timestamp are within a threshold period of time.

At block 710, time data can be accessed, identified, received, and/or determined. The voice based system 200 can identify a timestamp associated with a voice command. In some embodiments, the timestamp on can indicate a time when an audio signal corresponding to the voice command was received. For example, the timestamp can indicate the time when the audio signal was received by the voice-enabled device, by an additional device (such as a microphone of a conference system), and/or by the voice based system 200. In some embodiments, the voice enabled device can transmit the audio signal along with a corresponding timestamp.

In some embodiments, the voice-enabled devices and/or the voice based system 200 may be time synchronized. Any time synchronization protocol or method can be used, such as a network time protocol. For example, the voice-enabled devices and/or the voice based system 200 may communicate with a network time server, which can be private or public. Other example time synchronization solutions include Cristian's algorithm, the Berkeley algorithm, Clock Sampling Mutual Network Synchronization, Precision Time Protocol, Synchronous Ethernet, Reference broadcast synchronization, Reference Broadcast Infrastructure Synchronization, Synchronization in Ad-hoc Wireless Networks, and/or using a Global Positioning System synchronization. Time synchronization between devices may be off by a certain time value (e.g., 10-15 milliseconds); however, that time value offset may be well within the time delay of the underlying audio transmission systems (e.g., 1000 to 2000 milliseconds).

At block 720, the particular device associated with the command can be determined based on the time data. The arbitration service 270 can select a first voice command instead of a second voice command based at least in part on a first timestamp of the first voice command being earlier than a second timestamp of the second voice command. For example, a first voice command can be associated with a first timestamp (such as the value 1 millisecond) that indicates a time when the corresponding audio signal was received by voice-enabled device and/or the voice-based system. A second voice command can be associated with a second timestamp (such as the value 1000 milliseconds) that indicates a time when the corresponding audio signal was received by voice-enabled device and/or the voice-based system. Accordingly, the arbitration service 270 can select the first voice command because the first timestamp (with the value 1 millisecond) is earlier or less than the second timestamp (with the value 1000 milliseconds) of the second voice command.

At block 725, the command is executed. For example, the execution service 252 may execute the command that was determined to be associated with the particular voice-enabled device. The execution service 252 can execute a "leave the conference call" command for the particular location associated with the identified voice-enabled device, which may allow other conference participants at other locations to continue participating in the conference call. The execution service 252 can execute other commands that have been determined to be associated with the particular voice-enabled device.

The voice based system 200 can arbitrate among various voice commands based on user profile identification. The voice based system 200 can include technology to identify a user profile associated with an audio signal based on a voice fingerprint, a beacon, event data, and/or some combination thereof. The dynamic association between a user profile and an audio signal and an association between a user profile and a voice-enabled device can be used by the voice based system 200 to arbitrate between multiple voice-enabled devices that receive the same voice command.

Figure 8:
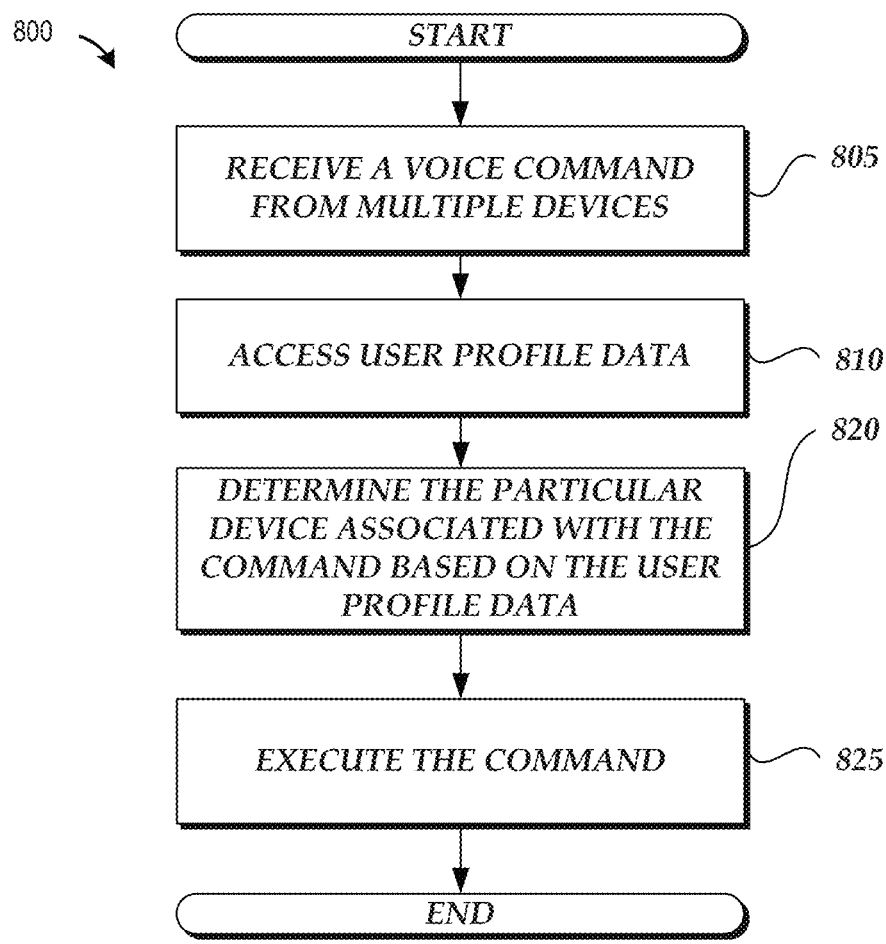
FIG. 8 is a flow diagram depicting an example method for arbitrating voice commands based on user profile data.

FIG. 8 is a flow diagram depicting an example method 800 for arbitrating voice commands based on user profile data. The method 800 can be implemented by a voice based system, such as the voice based system 200. For example, some of the blocks of the method 800 may be implemented by components of the voice based system 200, such as the arbitration service 270, the execution service 262, other components of the voice based system 200, and/or some combination thereof.

At block 805, a voice command from multiple devices can be received. For example, the voice based system 200 can receive audio signals from multiple voice-enabled devices, as described herein. Additional information regarding receipt of voice commands is described in further detail herein, such as with respect to FIGS. 4 (e.g., block 415) and 7 (e.g., block 705).

The same command can be determined to have been received and/or originated from the same group. As described herein, the voice based system 200 can receive many audio signals from disparate, unrelated voice-enabled devices within a period of time. Accordingly, the arbitration service 270 can determine that the same command was received from multiple devices from the same group using any of the methods described herein. Additional information regarding the determination of groups is described in further detail herein, such as with respect to FIGS. 3, 4, 5, and 7. Further, as described herein, the voice based system 200 may further determine that the same voice command was received within a threshold period of time, such as by determining that a first timestamp and a second timestamp are within a threshold period of time. In some embodiments, user profile data can be used to identify and/or generate a group, which is described in further detail herein, such as with respect to block 820 below.

At block 810, user data can be accessed. For example, the voice based system 200 can access user data, such as a user profile or a user voice profile. As described herein, a user profile can be associated with one or more voice-enabled devices. A user voice profile can be determined from an audio signal. Additional information regarding identifying a user voice profile is described in further detail herein, such as with respect to FIG. 9.

As another example, the voice based system 200 can identify a user profile based on a beacon. A user computing device different than a voice-enabled device can be associated with a user, such as a smartphone or tablet. The user computing device can be configured to transmit a beacon to the voice-enabled device where the beacon is associated with the user's profile. The voice-enabled device can transmit an indication to the voice based system 200 that a beacon associated with the user profile had been received. Example beaconing technology can use wireless signals such as Bluetooth or RFID. Thus, a beacon can independently and/or additionally be used to identify a user profile. Moreover, a beacon can independently and/or additionally identify a user at a particular location and/or proximately located near a voice-enabled device, which can be used for arbitration purposes.

As yet another example, the voice based system 200 can identify a user profile based on event data. As described herein, the voice based system 200 can retrieve, from event data, one or more user profile identifiers. One or more user profile identifiers may be present or can be determined from the event data and can indicate one or more users that are scheduled and/or have been invited to attend or participate in the event. Additional information regarding retrieving user profile identifiers based on event data are described in further detail herein, such as with respect to FIGS. 5 and 6. Similar to a beacon, event data can independently and/or additionally be an indicator that a user is at a particular location and/or proximately located near a voice-enabled device, which can be used for arbitration purposes.

At block 820, the particular device associated with the command can be determined based on the user profile data. The arbitration service 270 can select a first voice command instead of a second voice command based at least in part on a first entry that indicates the association between a user profile and a voice-enabled device. Arbitration in this manner generally corresponds to the voice based system 200 "listening" to speech utterances from a voice-enabled device where the user profile is already associated with the voice-enabled device. In a specific example, speech utterances may be accepted from a voice-enabled device where a specific user voice profile is already associated with the voice-enabled device. As described herein, the voice based system can develop such an association where a user has spoken in a particular location with a voice-enabled device in the past (such as a conference room or their office). Conversely, the voice based system 200 can ignore speech utterances received from other voice-enabled devices where the user does not have an association with those other voice-enabled devices (such as in another office where the user does not work or visit). Additional information regarding voice identification is described in further detail herein, such as with respect to FIG. 9. In some embodiments, a user voice profile and/or user profile may be specifically registered to a particular device, as described herein.

In some embodiments, the voice based system 200 can voice fingerprint participants in the conference call session. The voice based system 200 can identify a user profile based on an audio signal. Identifying the first user profile can be based on performing speaker recognition on the audio signal. The voice based system 200 can determine that the same voice is being received from multiple devices. However, due to the nature of time delay in common situations as described herein, the arbitration service 270 can associate the user voice profile with a particular voice-enabled device with the least amount of time delay. Additional information regarding time delay is described in further detail respect to FIG. 7.

In some embodiments, the voice based system 200 can perform arbitration based on impairment and/or watermarking. The voice based system 200 and/or a voice-enabled device can insert a tone of a specific frequency that the human ear cannot or may not be able to hear. For example, a human voice is approximately 5000 to about 18,000 kilohertz, so the voice based system 200 and/or a voice-enabled device can remove 9500 to 9550 kilohertz and the human ear probably couldn't hear that that gap is there, but the voice based system 200 on the receiving end of the signal can determine that the audio has been reproduced by an audio system and is not a direct speech utterance from a speaker.

In some embodiments, the voice based system 200 can determine or generate a group of multiple devices based on voice identification. The voice based system 200 can determine or generate a group of multiple voice-enabled device identifiers based on identification of a user voice profile that is present in multiple audio signals. As described herein, the voice based system 200 can receive many audio signals from disparate, unrelated voice-enabled devices within a period of time. Thus, a group for arbitration can be determined based on common user voice profiles that are identified in the audio signals. For example, a user voice profile can be identified as present in a first audio signal from a first voice-enabled device; the user voice profile can also be identified as present in a second audio signal from a second voice-enabled device; and the first voice-enabled device and the second voice-enabled device can be added to a group based at least in part on the identification of the user voice profile in both the first audio signal and the second audio signal.

At block 825, the command is executed. For example, the execution service 252 may execute the command that was determined to be associated with the particular voice-enabled device. The execution service 252 can execute a "leave the conference call" command for the particular location associated with the identified voice-enabled device, which may allow other conference participants at other locations to continue participating in the conference call. The execution service 252 can execute other commands that have been determined to be associated with the particular voice-enabled device.

Figure 9:
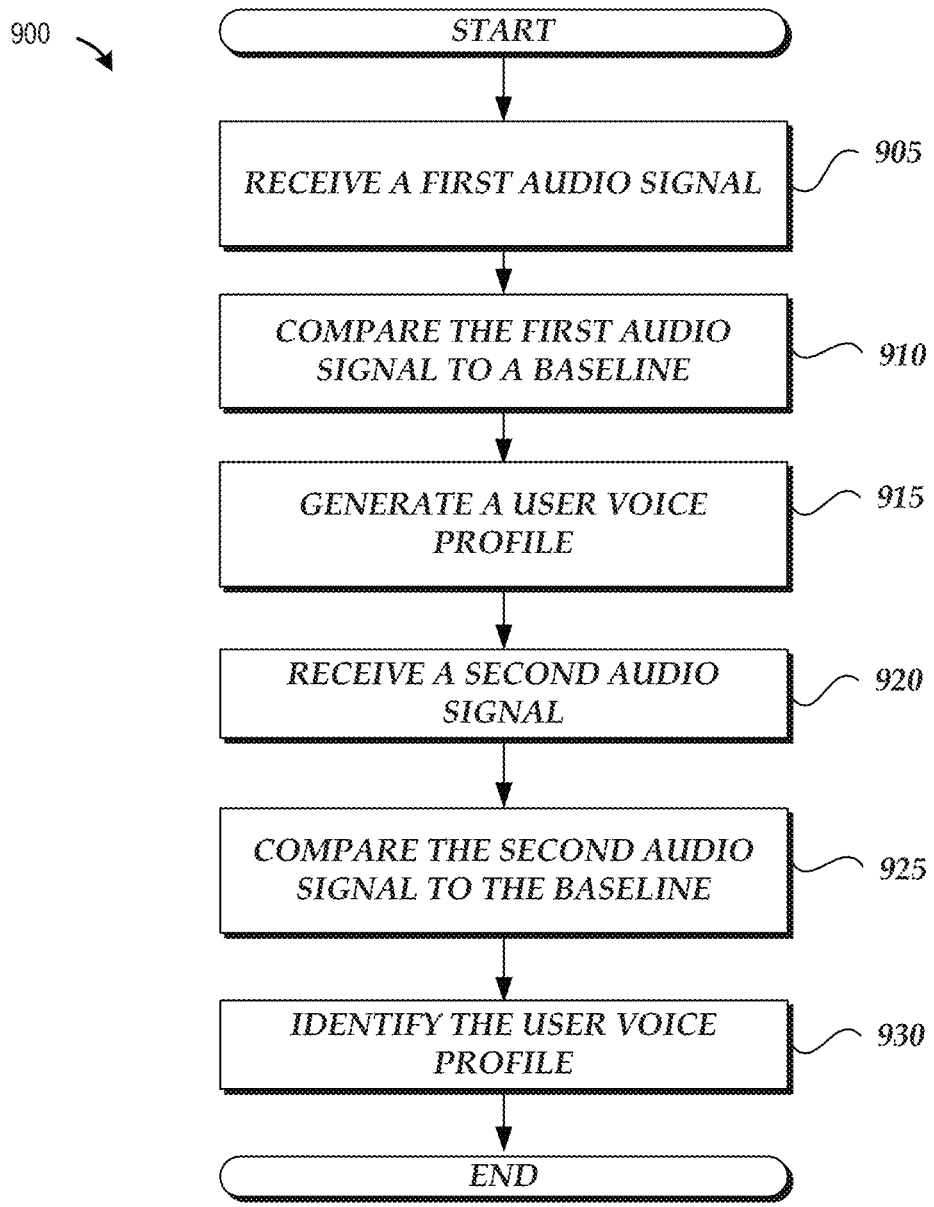
FIG. 9 is a flow diagram depicting an example method for user voice profile identification.

FIG. 9 is a flow diagram depicting an example method 900 for user voice profile identification. The method 900 can be implemented by a voice based system, such as the voice based system 200. For example, some of the blocks of the method 900 may be implemented by components of the voice based system 200, such as the automatic speech recognition (ASR) system 258, other components of the voice based system 200, and/or some combination thereof.

At block 905, a first audio signal received. For example, the voice based system 200 can receive a first audio signal. In some embodiments, the first audio signal can be received during a live conference call. In other embodiments, the first audio signal can be received from a voice-enabled device during a setup process. The purpose of the setup process can be for the voice based system 200 to walk a user through a training mode for the voice based system 200 to generate a user voice profile. Accordingly, the voice based system 200 can cause a voice-enabled device to prompt a user to say particular phrases for training purposes.

At block 910, the first audio signal can be compared to a baseline model. For example, the voice based system 200 can compare the first audio signal to a baseline model. The voice based system 200 can compare certain features of the first audio signal to the baseline model, such as tone, length, magnitude, pitch, or any other measurement of particular phrases or sounds.

At block 915, the user voice profile can be generated. For example, the voice based system 200 can generate a user voice profile that includes the results of the comparisons from the previous block 910. Thus, the user voice profile can include the differences from the user's speech to the baseline model.

At block 920, a second audio signal can be received. For example, the voice based system 200 can receive a first audio signal, which can be from a live conference call. The second audio signal can be voice fingerprinted as described below.

At block 925, the second audio signal can be compared to the baseline model. Similar to block 910, the voice based system 200 can compare the second audio signal to the baseline model. The voice based system 200 can compare certain features of the second audio signal to the baseline model, such as tone, length, magnitude, pitch, or any other measurement of particular phrases or sounds.

At block 930, a user voice profile can be identified. For example, the voice based system 200 can identify a user voice profile based on the results of the comparison from block 925. The voice based system 200 can compare the differences identified from the second audio signal and the baseline model at block 925 with the differences from the first audio signal the baseline model at block 910. If the differences are sufficiently similar, the voice based system 200 can identify the user voice profile as being present or associated with the second audio signal.

Additionally or alternatively to the method 900, the voice based system 200 may use other voice identification algorithms. The voice based system 200 can use various technologies to process and store voice fingerprints, such as, but not limited to, frequency estimation, hidden Markov models, Gaussian mixture models, pattern matching algorithms, neural networks, matrix representation, vector quantization, and/or decision trees. "Anti-speaker" techniques may be used, such as cohort models, and world models. Spectral features can be used in representing speaker characteristics. In some embodiments, noise reduction algorithms can be employed to improve accuracy.

Additional Embodiments and Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

The headings used herein are for organizational purposes only and are not meant to limit the scope of the description or the claims.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing a conference meeting, the system comprising:
an electronic data store; and
one or more computer hardware processors in communication with the electronic data store, the one or more computer hardware processors configured to execute computer-executable instructions to at least:
retrieve event data for a meeting involving a plurality of locations;
retrieve, from the event data, a plurality of location identifiers;
determine a group of voice-enabled devices, wherein determining the group comprises:
for each of the location identifiers, determining a voice-enabled device at a location corresponding to the location identifier, wherein each of the voice-enabled devices are in different rooms, and wherein voice input from a conference call participant is received by a first voice-enabled device and a second voice-enabled device of the voice-enabled devices;
identify a voice command received by the first voice-enabled device;
determine that the second voice-enabled device also received the voice command within a threshold period of time of receipt of the voice command by the first voice-enabled device;
determine that the voice command corresponds to a command to disconnect a voice-enabled device from a conference call;
select the first voice-enabled device, from the group of voice-enabled devices, based on a first energy level for the voice command from the first voice-enabled device and a second energy level for the voice command from the second voice-enabled device; and
execute the voice command, wherein execution of the voice command causes the first voice-enabled device to disconnect from the conference call.

2. The system of claim 1, wherein determining the group of voice-enabled devices further comprises accessing associations between a respective location identifier and a respective voice-enabled device.

3. The system of claim 1, wherein the one or more computer hardware processors are further configured to:
retrieve a first user profile based on information in the event data, wherein a first user associated with the first user profile is scheduled to attend the meeting.

4. The system of claim 3, wherein determining the group of voice-enabled devices further comprises:
identifying a first voice-enabled device identifier from a first entry in the first user profile, wherein the first entry indicates that the first voice-enabled device is registered to the first user profile.

5. The system of claim 3, wherein determining the group of voice-enabled devices further comprises:
identifying a first location identifier from a location property in the first user profile.

6. The system of claim 1, wherein the event data comprises a meeting invite.

7. A computer-implemented method comprising:
retrieving event data associated with a meeting involving a plurality of locations;
retrieving, from the event data, a plurality of location identifiers;
determining a group of voice-enabled devices, wherein determining the group comprises:
for each of the location identifiers, determining a voice-enabled device at a location corresponding to the location identifier, wherein the group comprises a first voice-enabled device and a second voice-enabled device;
identifying a voice command from the first voice-enabled device;
determining that the second voice-enabled device received the voice command;
selecting the first voice-enabled device, from the group of voice-enabled devices, based on a first energy level for the voice command from the first voice-enabled device and a second energy level for the voice command from the second voice-enabled device; and
executing the voice command for the first voice-enabled device instead of the second voice-enabled device.

8. The computer-implemented method of claim 7, wherein determining that the second voice-enabled device received the voice command further comprises determining receipt of the voice command by the second voice-enabled device occurred within a threshold period of time from receipt of the voice command by the first voice-enabled device.

9. The computer-implemented method of claim 7, further comprising:
retrieving, from the event data, a first user profile identifier; and
retrieving a first user profile for the first user profile identifier, wherein a first user associated with the first user profile received an invitation for the meeting.

10. The computer-implemented method of claim 9, wherein determining the group of voice-enabled devices further comprises:
identifying a first voice-enabled device identifier associated with the first user profile.

11. The computer-implemented method of claim 9, wherein determining the group of voice-enabled devices further comprises:
identifying a first location identifier from a location property in the first user profile, wherein the location property indicates an office location of the first user.

12. The computer-implemented method of claim 7, wherein retrieving the event data further comprises:
generating an event retrieval request;
transmitting the event retrieval request to a calendaring server; and
receiving, from the calendaring server, the event data.

13. The computer-implemented method of claim 7, wherein the second voice-enabled device is located in a room with a speaker device separate from the second voice-enabled device, and wherein audio originating from the first voice-enabled device for the conference call is reproduced in the room by the speaker device.

14. A system comprising:
one or more computer hardware processors, the one or more computer hardware processors configured to execute computer-executable instructions to at least:
retrieve, from event data, a plurality of location identifiers;
determine a group of voice-enabled devices, wherein determining the group comprises:
for each of the location identifiers, determining a voice-enabled device at a location corresponding to the location identifier, wherein the group comprises a first voice-enabled device and a second voice-enabled device;
identify a voice command from the first voice-enabled device;
determine that the second voice-enabled device received the voice command;
select the first voice-enabled device, from the group of voice-enabled devices, based on a first energy level for the voice command from the first voice-enabled device and a second energy level for the voice command from the second voice-enabled device; and
execute the voice command for the first voice-enabled device instead of the second voice-enabled device.

15. The system of claim 14, wherein determining the group of voice-enabled devices further comprises obtaining associations between a respective location identifier and a respective voice-enabled device.

16. The system of claim 14, wherein the one or more computer hardware processors are further configured to:

determine a first user profile based on information in the event data; and
confirm that a beacon associated with the first user profile is received by one of the voice-enabled devices.

17. The system of claim 16, wherein determining the group of voice-enabled devices further comprises:
identifying a first voice-enabled device identifier associated with the first user profile.

18. The system of claim 17, wherein the beacon is transmitted to the first voice-enabled device via at least one of radio-frequency identification (RFID) or Bluetooth.

19. The system of claim 16, wherein determining the group of voice-enabled devices further comprises:
identifying a first location identifier associated with the first user profile.

20. The system of claim 14, wherein the one or more computer hardware processors are further configured to at least:
retrieve the event data from a calendaring server.

* * * * *